US011416969B2

(12) United States Patent
Arrieta

(10) Patent No.: US 11,416,969 B2
(45) Date of Patent: Aug. 16, 2022

(54) SYSTEM, METHOD AND COMPUTER PROGRAM PRODUCT FOR REMOTING ORIENTATION CHANGES

(71) Applicant: Intelligent Waves LLC, Reston, VA (US)

(72) Inventor: Galib F. Arrieta, Austin, TX (US)

(73) Assignee: Hypori LLC, Reston, VA (US)

( * ) Notice: Subject to any disclaimer, the term of this patent is extended or adjusted under 35 U.S.C. 154(b) by 133 days.

(21) Appl. No.: 17/060,708

(22) Filed: Oct. 1, 2020

(65) Prior Publication Data
US 2021/0027428 A1  Jan. 28, 2021

Related U.S. Application Data

(63) Continuation of application No. 16/030,432, filed on Jul. 9, 2018, now Pat. No. 10,796,412.

(60) Provisional application No. 62/529,870, filed on Jul. 7, 2017.

(51) Int. Cl.
| | |
|---|---|
| *G06T 3/60* | (2006.01) |
| *G06F 21/60* | (2013.01) |
| *G06F 9/451* | (2018.01) |
| *H04L 67/08* | (2022.01) |
| *H04L 67/04* | (2022.01) |
| *H04W 4/02* | (2018.01) |
| *G06F 21/53* | (2013.01) |

(Continued)

(52) U.S. Cl.
CPC ............ *G06T 3/60* (2013.01); *G06F 9/452* (2018.02); *G06F 21/53* (2013.01); *G06F 21/604* (2013.01); *H04L 67/04* (2013.01); *H04L 67/08* (2013.01); *H04W 4/027* (2013.01); *G06F 3/1454* (2013.01); *G09G 2340/0492* (2013.01); *G09G 2354/00* (2013.01); *G09G 2370/022* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,990,394 B2 * | 8/2011 | Vincent | G06T 19/20 |
| | | | 700/208 |
| 8,610,730 B1 | 12/2013 | Li et al. | |
| 9,203,950 B2 * | 12/2015 | Choi | H04M 19/048 |

(Continued)

OTHER PUBLICATIONS

Notice of Allowance issued in corresponding U.S. Appl. No. 16/030,432 dated May 28, 2020 (8 pages).

*Primary Examiner* — Saptarshi Mazumder
(74) *Attorney, Agent, or Firm* — Pillsbury Winthrop Shaw Pittman, LLP

(57) ABSTRACT

A mobile device comprising a client application configured to receive a display stream for a virtual display of a virtual device, render a remote display in a local system user interface (UI), register a device orientation change of the mobile device, send an orientation change event message to the server, change the local system UI orientation to match the new orientation of the remote system UI based on receipt of a UI orientation signal that indicates a new orientation of the remote system UI of the virtual device, transform the display stream to compensate for changing the local system UI orientation to match the new orientation of the remote system UI and render the remote display from the transformed display stream.

20 Claims, 19 Drawing Sheets

(51) Int. Cl.
  *H04L 67/01* (2022.01)
  *G06F 3/14* (2006.01)

(56) References Cited

U.S. PATENT DOCUMENTS

| | | |
|---|---|---|
| 2006/0136828 A1 | 6/2006 | Asano |
| 2012/0249792 A1 | 10/2012 | Wilborn |
| 2013/0219277 A1 | 8/2013 | Wang et al. |
| 2014/0002494 A1 | 1/2014 | Cunningham |
| 2014/0289668 A1 | 9/2014 | Mavrody |
| 2015/0120616 A1* | 4/2015 | Sullivan ............. G06Q 30/0205 706/11 |
| 2017/0364770 A1 | 12/2017 | Zagaynov et al. |

* cited by examiner

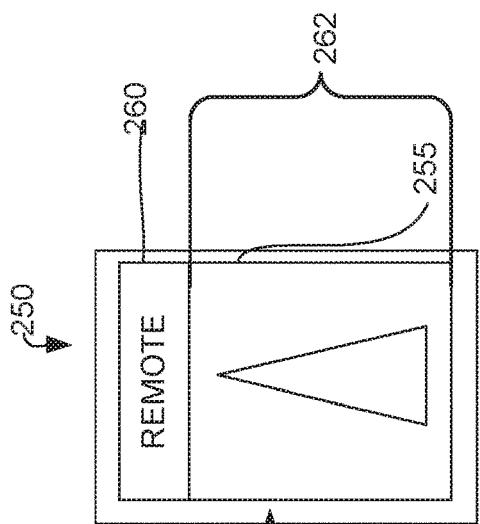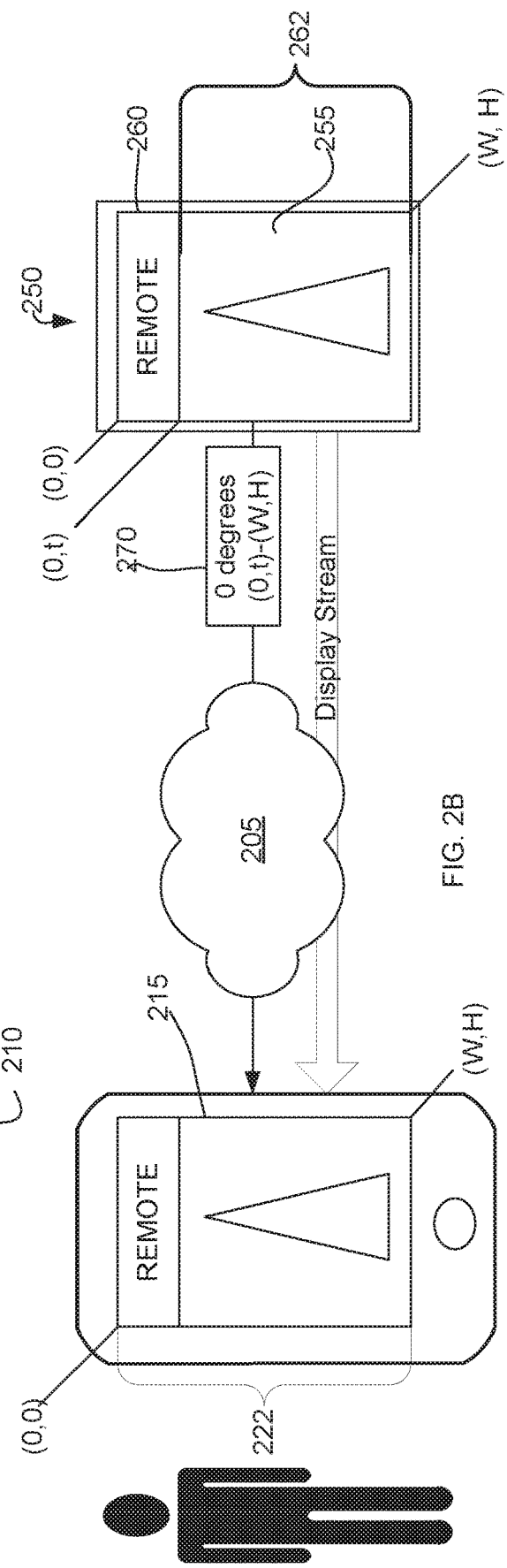
FIG. 2A
FIG. 2B

SYSTEM, METHOD AND COMPUTER PROGRAM PRODUCT FOR REMOTING ORIENTATION CHANGES

RELATED APPLICATIONS

This application claims the benefit of priority under 35 U.S.C. § 119(e) of U.S. Provisional Patent Application No. 62/529,870, entitled "SYSTEM, METHOD AND COMPUTER PROGRAM PRODUCT FOR REMOTING ORIENTATION CHANGES," filed Jul. 7, 2017, which is hereby fully incorporated by reference herein for all purposes.

TECHNICAL FIELD

Embodiments relate generally to mobile device platforms. More particularly, embodiments disclosed herein relate to systems, methods and computer program products for remoting orientation changes in a virtual mobile device platform. Even more particularly, embodiments relate to efficiently communicating orientation changes to synchronize local and remote user interfaces.

BACKGROUND

Many organizations have a Bring Your Own Device ("BYOD") policy with respect to mobile devices. A challenging but important task for organizations that utilize BYOD is to develop a policy that defines exactly what sensitive company information needs to be protected and which employees should have access to this information, and then to educate all employees on this policy. Commercial carriers are normally relied upon for implementing the security requirements of an organization's BYOD policy.

Even with robust security policies in place, BYOD can raise serious security issues. For example, a security breach may occur if an untrusted party gains access to a user's mobile device and is able to retrieve unsecured data on the device. Another type of security breach can occur when an employee leaves an organization but does not have to return the mobile device back to the employer. In this situation, company-owned applications and data may remain on the ex-employee's device.

Because of Internet-based risks, some very risk-averse organizations issue devices specifically for Internet use (this is termed "Inverse-BYOD"). The organization provides unfiltered access to the Internet and reserves filtered, sensitive network data for use within a secured, private network. However, under these policies, a user likely has to carry multiple devices (including one for his personal use) and organizations do not have a sure way of preventing the user from using his or her personal mobile device to communicate non-sensitive but company-related information. As such, organizations continue to search for solutions that allow mobile services to be delivered or shared within a single device, rather than having to issue their users multiple devices or separate devices for their personal use and locking them into private networks.

Finding viable solutions to handle mobile devices can be particularly challenging for organizations that operate in high assurance computing environments. A high assurance computing environment is one that provides a certain level of assurance as to its behavior and is useful in ensuring a level of secrecy for classified information. For instance, a high assurance operating system may permit only certain certified applications to access a particular portion of a memory on a device where sensitive information is stored.

However, this does not prevent the physical device itself from being suspect due to the way it was manufactured or deployed. Moreover, a mobile device may be compromised in many ways during use. For example, an untrusted party who gains access to the mobile device (e.g., because the mobile device was left unattended, stolen, or lost) may be able to access information stored or cached on a mobile device. As other examples, a user may inadvertently download an infected application, receive an infected document or access and infected service that installs software to steal data from the mobile device.

Because a mobile device lives in a hostile world, securing the physical device itself (e.g., via hardware, encrypted storage, biometrics, and other security mechanisms) is not sufficient to protect some data. Even if some security measures are put in place, infiltration from any portion of the stack—from the chips in the mobile device, to the software that is installed on the mobile device, to the data the device receives—still leaves the device vulnerable to attacks from well-funded, motivated, adversaries. Attempts to provide the level of separation needed within the actual device face many obstacles.

The unique challenges involved in incorporating mobile devices into secure computing environments can be addressed at least in part using a virtual mobile infrastructure (VMI) that provides virtual devices running on a server at, for example, a remote data center or a cloud computing system. In a VMI system, a VMI client app on a physical mobile device (e.g., a mobile thin client app) provides user access to a virtual mobile device executing on the remote server. Typically, the VMI client app captures local events and sends the events to the virtual device. The virtual device processes the events and the virtual mobile device's user interface (UI) to generate a remote display that may be encoded, compressed and passed back to the VMI client app for processing and display on the physical mobile device. Thus, the remote display can be displayed in the local UI of the physical device. VMI can thus give access to apps and data of a virtual device running in a secure environment while keeping the apps and associated data storage off of the mobile device, solving many security and management challenges.

The generation of remote displays is not without its challenges. Historically, virtual device systems were developed under a traditional desktop computer paradigm in which the display orientation is static. Some mobile devices (e.g., many mobile phones and tablets), however, are capable of sensing the screen orientation and rotating the local UI accordingly. This can cause the local system UI and remote system UI to have different orientations, significantly degrading the user experience. Simply providing the virtual device with the ability to rotate the remote system UI, however, does not solve orientation issues. Many apps prevent the mobile OS from rotating the UI for a variety of reasons. If such an app prevents the virtual device UI from rotating when the local UI rotates, the local UI and remote UI will be out of sync.

SUMMARY

One embodiment comprises a mobile device coupled to a server. The mobile device comprises a mobile device processor, an accelerometer, a mobile device non-transitory computer readable medium, and client device instructions stored on the mobile device non-transitory computer readable medium. The client device instructions are executable to receive a display stream for a virtual display of a virtual device and render a remote display from the display stream in a local system user interface (UI), the local system UI having a local system UI orientation. The remote display may comprise an image of the virtual display. The client device instructions are further executable to register a device orientation change of the mobile device and send an orientation change event message to the server based on registering the device orientation change. The client device instructions are further executable to change the local system UI orientation to match a new orientation of the remote system UI based on receipt of a UI orientation signal that indicates a new orientation of a remote system UI of the virtual device. The client device instructions are further executable to transform the display stream to compensate for changing the local system UI orientation to match the new orientation of the remote system UI and render the remote display from the transformed display stream.

According to one embodiment, the client device instructions are further executable to receive accelerometer signals from the accelerometer of the mobile device, map the accelerometer signals to the device orientation change and determine if the device orientation change remained constant for a time window. The device orientation change may be registered based on a determination that the device orientation change remained constant for the time window.

The client device instructions may be further executable to receive a size of the virtual display and coordinates of a remote application visible area of the virtual display. The remote display may be rendered in a first mode of operation (e.g., a full screen mode) in which all of the virtual display is displayed as the remote display. In such a mode, the local system UI status bars may be hidden by the remote display. The remote display may be rendered in a second mode of operation (e.g., a seamless mode) in which the remote application visible area of the virtual display is displayed in the remote display and the remote display is displayed together with local system UI status information.

A server may host the virtual device. The server further comprises a server processor, a server non-transitory computer readable medium, and server instructions stored on the server non-transitory computer readable medium. The server instructions are executable to receive the orientation change event message at a synthetic accelerometer, generate a set of synthetic accelerometer signals selected to pass a low pass filter of the virtual device, determine the device orientation change based on the synthetic accelerometer signals, change the remote system UI to the new orientation based on the determined device orientation change, generate a new virtual display for the new orientation, send the UI orientation signal to the mobile device and send the new virtual display to the mobile device in the display stream.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein:

FIG. 2A illustrates one embodiment of a system having a client device and remote device where the client device is a first orientation;

FIG. 2B illustrates an embodiment of a client application connected to a remote device;

DESCRIPTION

Figure 1A:
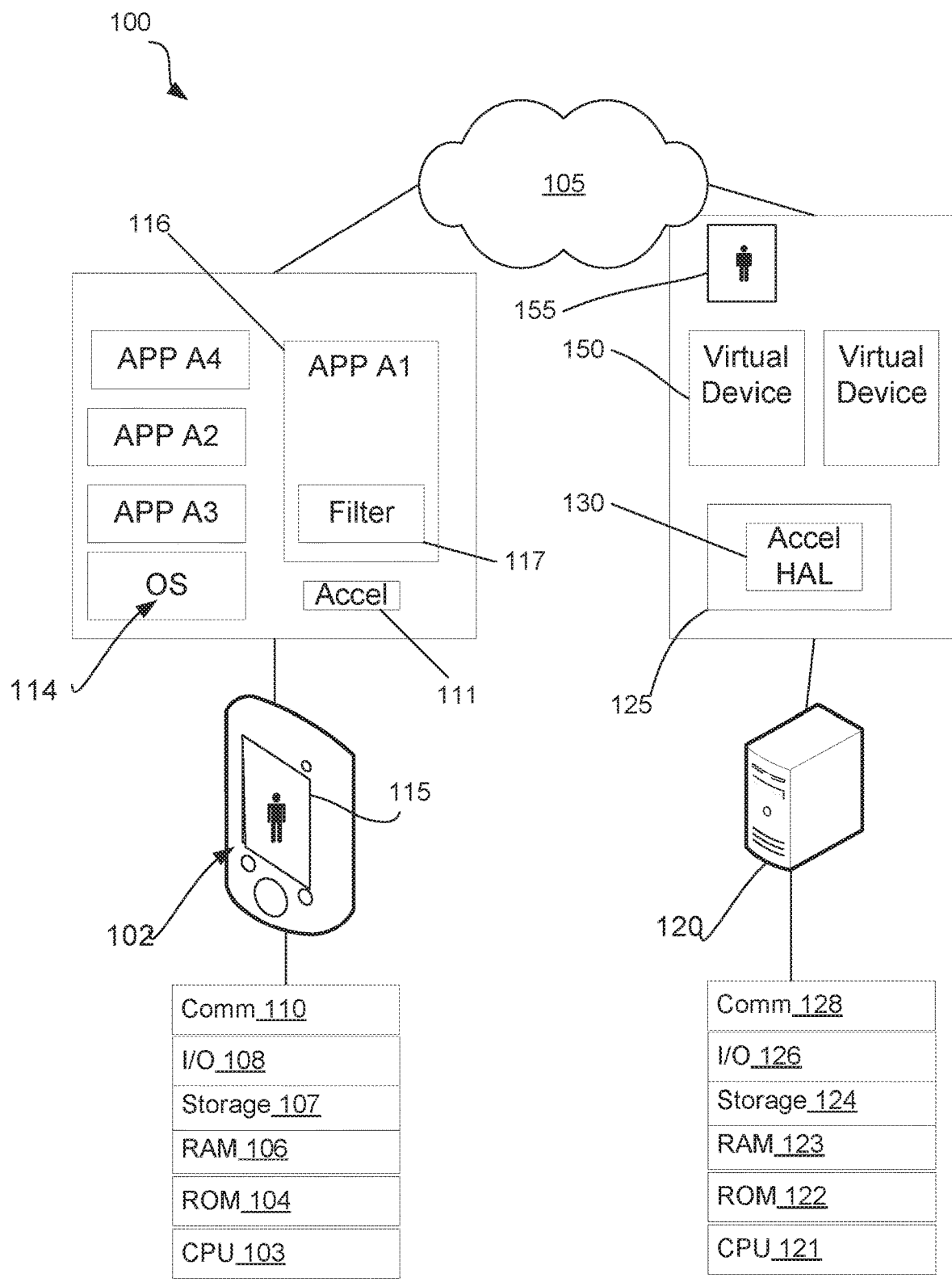
FIG. 1A illustrates one embodiment of a network system with a mobile device in a first orientation.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Embodiments described herein solve the problem of synchronizing orientation changes between client device and a remote, typically virtualized, device. Synchronizing orientation changes may be achieved using very low network traffic, while presenting a natural and coherent user experience.

According to one embodiment, a client application running on a mobile device renders a remote virtual display generated by a remote device as a remote display in the local system user interface (UI). The client application can configure the local system UI to mirror the remote device system UI orientation. This provides a good user experience because the user will be able to use intuitive gestures to bring forward local status bars, local system trays, or other locally generated display elements.

The client application can render the remote display in a seamless mode. In this mode, the local status bar or other locally generated display elements coexists visually with the remote display content. The client application, however, removes or crops away parts of the display stream that relate to the remote device system UI: e.g., the remote device status bar, the remote navigation bar, or other display elements generated by the remote device system UI. The local status bar may be aligned with the remote application UI, making it appear as though a remote application being used is executing in the local operating system.

If the client application registers a device orientation change of the mobile device, the client application sends an orientation change event message to the remote device based on registering the device orientation change. According to one embodiment, only one message is sent to the remote device for an orientation change that happens at the client device. This can save network bandwidth when compared to the alternative of sending many acceleration vectors over the network to the remote device. Embodiments may include a low pass filter in the client application that avoids sending spurious orientation changes to the remote device, providing a visually cleaner and glitch-less user experience.

The client device instructions are further executable to change the local system UI orientation to match a new orientation of the remote system UI based on receipt of a UI orientation signal that indicates a new orientation of a remote system UI of the virtual device. The client device instructions are further executable to transform the display stream to compensate for changing the local system UI orientation to match the new orientation of the remote system UI and render the remote display from the transformed display stream.

Figure 1B:
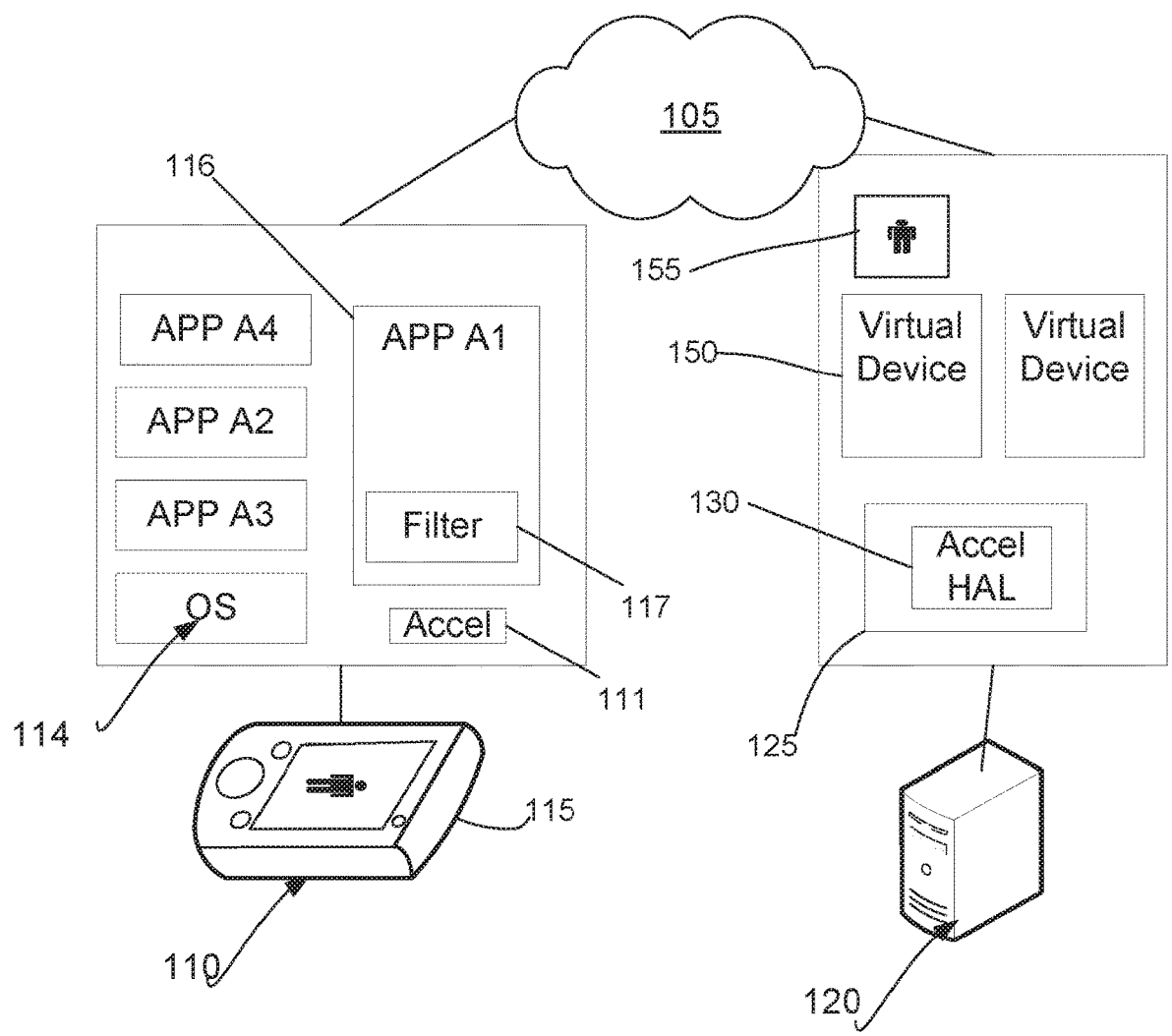
FIG. 1B illustrates the network system of FIG. 1A with the mobile device in a second orientation.
Figure 1C:
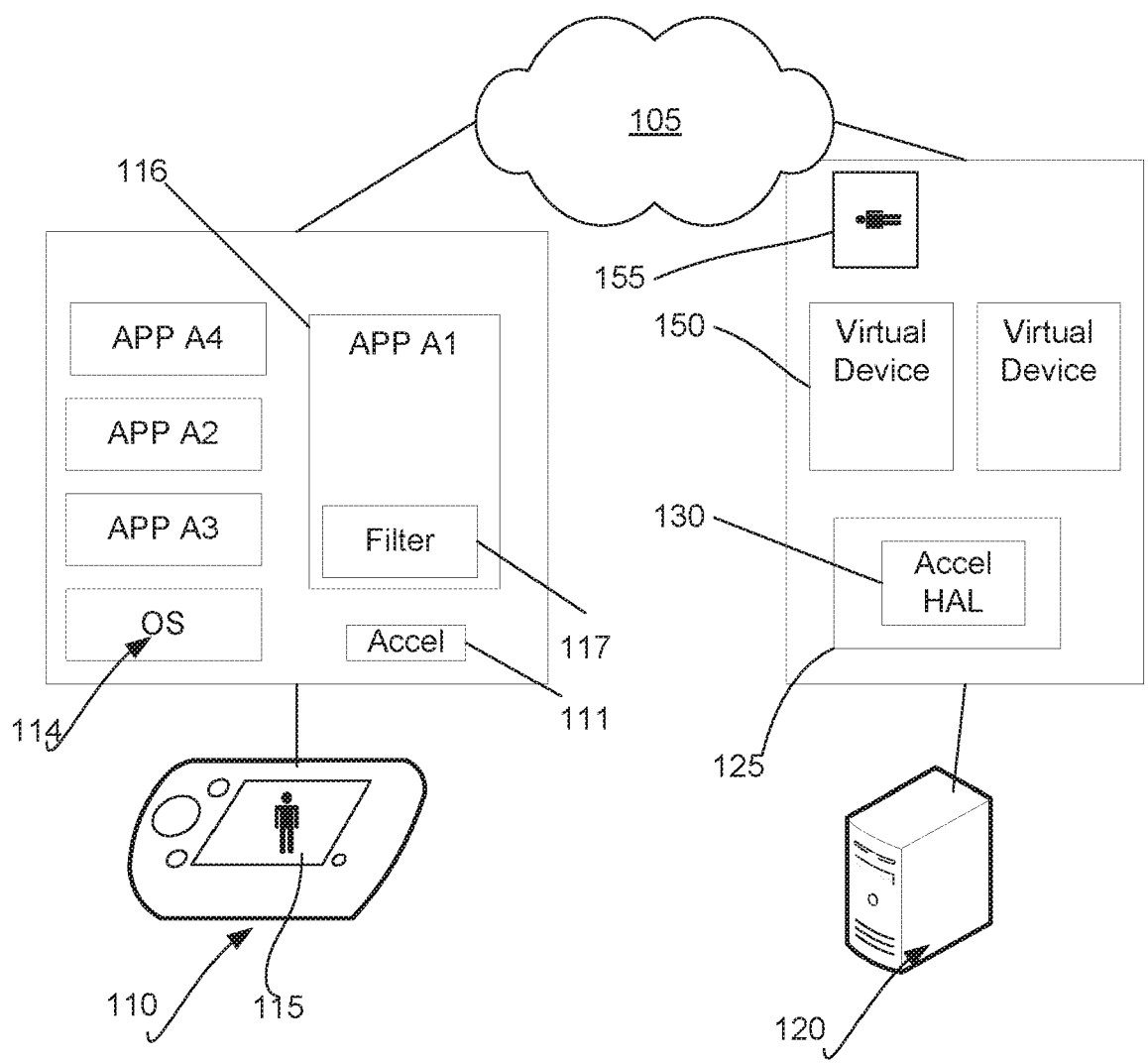
FIG. 1C illustrates the network system of FIG. 1A with the mobile device in the second orientation and illustrates one embodiment of a synchronized user interface orientation.

FIG. 1A illustrates one embodiment of a network system 100 in which user interface orientation synchronization may be utilized. FIG. 1B illustrates network system 100 with a mobile device rotated to a new orientation. FIG. 1C illustrates network system 100 with a synchronized user interface orientation. Network system 100 comprises a physical mobile device 102 connected to a remote server 120 via a network 105. Network 105 may be, for example, a wireless or wireline communication network such as the Internet or wide area network (WAN), publicly switched telephone network (PTSN) or any other type of communication link.

Mobile device 102 can include central processing unit ("CPU") 103, read-only memory ("ROM") 104, random access memory ("RAM") 106, persistent storage memory 107 (e.g., a hard drive ("HD")), input/output device(s) ("I/O") 108 and communications interfaces 110. I/O 108 can include, for example, a touch screen display or other input/output devices. Communications interface 110 may include a network interface. Server system 120 may include a CPU 121, ROM 122, RAM 123, hard drive (HD) or other storage memory 124, I/O 126 and communications interfaces 128. I/O 126 can include, for example, a keyboard, mouse, display or other input/output devices. Communications interface 128 may include a network interface. For the purpose of illustration, a single system is shown for each of mobile device 102 and remote server 120. However, a plurality of mobile devices and servers may be interconnected to each other over network 105. Moreover, each of the mobile devices or servers may have more than one CPU, ROM, RAM, HD or other storage memories, I/O, or other hardware components. Portions of the methods described herein may be implemented in suitable software code that may reside within ROM 104 or 122; RAM 106 or 123; or storage memory 107 or 124.

Mobile device 102 may implement software instructions to provide a mobile device operating system (OS) 114 and a variety of applications (apps) executable in OS 114. As will be appreciated by those in the art, a mobile device OS may provide a system user interface ("UI") that can display information generated by the local system UI or applications running in OS 114. A portion of the system UI is used to display information provided by the system UI of a mobile device regardless of the application executing in the OS (e.g., information such as status bars, navigation bars or other information) while an application area is used display the content/interface of the application executing in the operating system based on the current context for the system UI. In a full screen mode, the entire system UI display area is used as the application area, while the local system UI information is hidden.

Mobile device 102 can run a number of applications (apps) in a mobile operating system 114. In particular, mobile device 102 may include a client application 116 that acts as a virtual mobile infrastructure (VMI) client application. Client application 116 provides access to a virtual mobile device 150 executing at server 120. Client application 116 can provide access to apps and data of a virtual device 150 while keeping the apps and associated data storage off of the mobile device 102, helping to address many security and management challenges.

Client application 116 may further broker access to local functions of mobile device 102 including physical interfaces (e.g., soft and hard keyboards, touchscreen, Global Positioning System (GPS), camera, accelerometer, speakers, microphone, phone dialer, etc.) and Virtual Private Network (VPN) software that connects across a public network to a server (e.g., server 120) over encrypted network interfaces. Those skilled in the art will appreciate that local device functions may vary depending upon the type of mobile device 102. For example, mobile device 102 can be a touchscreen smartphone with local device functions such as the touch screen, the dialer/phone network, camera, GPS, keyboard, speakers, microphone, and so on. Other examples of mobile device 102 may include touchscreen tablets and other touch-enabled mobile devices.

Various mobile device functions can be provided by embodiments disclosed herein on protected hardware and software without adversely affecting (or only minimally affecting) the user's experience in interacting with mobile device 102. To this end, server 120 may implement software instructions executable to provide a hosted, networked, application environment. More particularly, server 120 may be a virtualization server providing a virtualization server software architecture 125 comprising software components configured to provide virtual devices 150. Those skilled in the art will appreciate that a virtual "device" is a not really a device—it is a remote execution environment for the services and applications that make up a device. Each virtual device 150 may thus be a remote execution environment for the services and applications that make up a mobile device and thus a virtual device 150 may function similarly to a physical mobile device except that the mobile device operating system, data and apps reside and run on a server. Virtual devices 150 may thus include applications (referred to as remote applications), such as browsers, games, productivity applications or other applications that execute in virtual devices 150. In one embodiment, server 120 is configured as an Android application environment. In some embodiments, virtual devices hosting Android (or Security Enhancements for Android (SEAndroid)) may be created for each user using Linux's Kernel-based Virtual Machine (KVM) and Quick EMUlator (QEMU). According to one embodiment, server 120 can be a server in a virtualization cloud and client application 116 may be a virtualization cloud client application ("VC client application").

The OS of a virtual device 150 may comprise a system UI (a "remote system UI") to generate a virtual display 155. The virtual display 155 may include information provided by the OS of the virtual device 150 regardless of the remote application executing in the virtual device 150, such as a status bar, navigation bar and other display elements provided by the OS. Virtual display 155 also includes a remote application visible area that is used to display content/interface of the remote application (browser, game, productivity app, or other app) executing on the virtual device 150. It can be noted that since the virtual display 155 is generated by a virtual device 150, virtual display 155 may not be visible on a display device. The virtualization software framework 125 can be configured to provide virtual display 155 as a display stream to client application 116 for rendering in the system UI of client device 102 as remote display 115.

The OS of a virtual device may also provide a sensor framework. By way of example, but not limitation, the Android OS provides an Android sensor framework that allows applications to access software and hardware sensors. Other mobile OS's similarly provide sensor frameworks that allow applications to access sensor data. The virtualization software framework 125 may include a synthetic accelerometer hardware abstraction layer (HAL) 130 to provide synthetic accelerometer signals to the sensor framework of virtual device 150.

According to one embodiment, client application 116 is a software thin client that provides an image stream of the user interface of a remote device including the user interface of a remote application (e.g., browser, game, productivity application) executing on a virtual device (e.g., on a remote virtual device 150 or other remote device). Client application 116, according to one embodiment, renders an image of the virtual display 155 as a remote display 115 in the application area of the local system UI of mobile device 102. In a full screen mode (if supported), the remote display 115 may include bars and other information provided by the remote system UI of the virtual device 150. In another mode of operation, client application 116 renders remote display 115 such that the remote application visible of virtual display 155 is visible in conjunction with the status bars or other information generated by the local system UI.

Client application 116 further captures events and sends the events to a virtual device 150. The virtual device 150 processes the events to update virtual display 155, which may be encoded, compressed and passed back to the client application 116 as a display stream for processing and display on the physical mobile device 102. The display stream is an image stream of the virtual display 155. Thus, client application 116 can render a display generated by the system UI of a remote virtual device 150 (a remote system UI) as a remote display 115 in the local system UI.

Software virtualization framework and client application 116 are configured to communicate various event data including, but not limited to, UI orientation signals and orientation change messages. Virtual device 150 sends UI orientation signals to client application 116 to provide display information to client application 116 and client application 116 sends orientation change event messages to notify virtual device 150 of a change in orientation of mobile device 102. Event signals, such as orientation change event messages from client application 116 to server 120 and new UI orientation signals from server 120 to client application 116 may be communicated on an event channel asynchronous with the display stream.

A UI orientation signal can comprise several pieces of display information. A UI orientation signal may include, for example, i) the dimension in pixels of the virtual display (height and width); ii) remote system UI orientation angle; iii) rectangle coordinates of the remote application visible area in the virtual display 155. The remote application visible area rectangle may exclude the area reserved by the remote system UI for, for example, the status bar or navigation bar (e.g., the remote application visible area rectangle excludes the portion of the virtual display reserved for exclusive use of the OS and delineates the portion of display 155 used for displaying content of mobile apps executing in the OS of virtual device 150).

The virtual device 150 can be configured to send client application 116 a UI orientation signal when client application connects to virtual device 150. Client application 116 is configured to mirror the orientation angle of the remote system UI when it connects. Thus, if the remote system UI has an orientation angle of 0 degrees (e.g., portrait mode), client application 116 can enforce an orientation angle of 0 degrees for the local system UI. For example, in FIG. 1A, client application 116 mirrors the remote UI orientation angle.

According to one embodiment, client application 116 may support multiple display synchronization modes of operation. In a full screen mode, in which the entire local system UI display area is used to display the content/interface of client application 116, client application 116 renders the complete virtual display 155 as remote display 115. Thus, the remote display 115 includes both the remote OS portion (e.g., the remote status bar, navigation bars) and remote application visible area of virtual display 155. In this mode, client application 116 can disregard the rectangle coordinates of the remote application visible area as it can simply render the entire visible area of virtual display 155 as remote display 115, while hiding the local UI status bar, navigation bars or other local system UI information. In another mode, referred to herein as "seamless" mode, the client application 116 displays the remote application visible area of virtual display 155 as remote display 115, but maintains the local system UI status bar, navigation bars, and other information provided by the local OS in the visible display.

OS 114 of mobile device 102 may provide the capability to change the orientation of the local user interface (display mode) as mobile device 102 changes physical orientations. To support this functionality, OS 114 can include APIs that can be used to notify client application 116 whenever the orientation of the device 102 is changed by the user. OS 114 may, for example, expose data from accelerometer 111 which frequently broadcasts an X, Y, Z acceleration vector representing the current orientation of the physical device 102 with respect to the gravitational force. The accelerometer data may be mapped by client application 116 to a device orientation change (e.g., rotate 90 clockwise). In some cases, higher level APIs may be available that simply disclose display orientation changes in terms of names like "portrait", "landscape", "reverse landscape", "upside down portrait", etc. Because high level APIs sometimes do not report the correct orientation, it may be preferable to use accelerometer data. However, some embodiments may use the higher level APIs to register orientation changes.

According to one embodiment, client application 116 can implement a low pass filter 117 to filter orientation data. This filter may be applied in addition to any filters applied by the OS or otherwise prior to the orientation data (e.g., the accelerometer signals) reaching client application 116. Low pass filter 117 can be configured to compensate for network delays that are not typically of concern to the operating system 114 when providing acceleration data to a locally running application.

Low pass filter 117 may use a time window. If the orientation change remains constant within the time window, client application 116 can register an orientation change. The time window may be configured to achieve a desired system response. A short time window may result in too many orientation change messages being sent to virtual device 150 causing virtual device 150 to needlessly change the system UI orientation and increasing network latency. If the time window is too long, there may be noticeable lag between a change in physical device 102 orientation and a change in UI orientation or an orientation change may not be detected at all. According to one embodiment, the time window can be 200-800 ms, and more preferably 350-450 ms. By way of example, but not limitation, a time window of 400 ms may be used. Other time windows may also be selected. Alternatively, a client application 116 may be configured to send all, or most, acceleration vectors to server 120 as they are exposed by the OS 114, but this approach requires more network bandwidth.

Based on registering an orientation change of mobile device 102, whether from accelerometer data or a higher level API message, client application 116 can send an orientation change event message to virtual device 150 that includes the orientation change of mobile device 102. According to one embodiment, the orientation change may be expressed as a new orientation angle. For example, the orientation change event message may specify the new orientation angle as an acceleration vector, such as:

180 degrees Clockwise: Xk, Yk, Zk=(0.0, −kGravity, 0.0)
270 degrees Clockwise: Xk, Yk, Zk=(kGravity, 0.0, 0.0)
0 degrees Clockwise: Xk, Yk, Zk=(0.0, kGravity, 0.0)
90 degrees Clockwise: Xk, Yk, Zk=(−kGravity, 0.0, 0.0)

where kGravity is a constant equal to the gravitational acceleration.

As with physical device 102, the OS or a remotely running application in the OS of a virtual device 150 may process accelerometer signals to determine if an orientation change has occurred. HAL 130 receives orientation change event messages from client application 116 and dispatches synthetic accelerometer values to the sensor framework of virtual device 150.

The set of synthetic accelerometer values can include values that are similar, but not identical. The number, timing of the synthetic accelerometer values and the differences between values can be selected to compensate for accelerometer data filters applied by virtual device 150 (e.g., by the virtual device OS or remotely running application) so that the remote application running in virtual device 150 will register the orientation change. In one embodiment, for example, synthetic accelerometer HAL 130 dispatches six accelerometer vectors to the sensor framework of the virtual device 150. These vectors may be dispatched monotonically at a desired frequency, say every 30 ms.

For example, when the received orientation change event message contains the accelerometer data Xk, Yk, Zk=(−kGravity, 0.0, 0.0)), the HAL 130 can dispatch the following vectors:

At time0, (X0,Y0,Z0)=(Xk−1.0, Yk+1.0, 0.0)
At time1, (X1,Y1,Z1)=(Xk+1.0, Yk−1.0, 0.0)
At time2, (X2,Y2,Z2)=(Xk, Yk, 0.0)
At time3, (X0,Y0,Z0)=(Xk−1.0, Yk+1.0, 0.0)
At time4, (X1,Y1,Z1)=(Xk+1.0, Yk−1.0, 0.0)
At time5, (X2,Y2,Z2)=(Xk, Yk, 0.0)
time1=(time0+30 ms) and time2=(time1+30 ms), and so on.

The OS of virtual device 150 may apply a low pass filter to the received synthetic acceleration vectors as it would if the vectors were generated by a hardware accelerometer. The synthetic accelerometer signals are selected so the mobile OS of the virtual device 150 does not filter out the orientation change. When the OS or application running in the OS of virtual device 150 detects a valid orientation change, the remote system UI of virtual device 150 can attempt to redraw the virtual display 155 accordingly, as indicated in FIG. 1C. The remote system UI sends a new UI orientation signal to client application 116 including the new UI orientation angle and rectangular area of the remote application visible area. In addition, virtual device 150 sends a display stream with the updated virtual display 155 to client application 116. Client application 116 changes the orientation of the local system UI in response to the orientation change signal. The client application may also rotate the display stream to display remote display 115 appropriately, as illustrated in FIG. 1C.

However, some applications are configured to run in a constant orientation. If one of these applications is the current context of the remote system UI of virtual device 150 when the orientation change event message is received, the remote system UI will not redraw the system UI display 155 in a new orientation and will not send a new UI orientation signal to client application 116. Consequently, client application 116 will not change the orientation of client UI and will continue to render remote display 115 in the same UI orientation. Thus, in the above described embodiments, the client application 116 is the slave of the remote device with respect to UI orientation.

Various features of embodiments of synchronizing orientations changes may be better understood in the context of some examples. FIGS. 2A-2H (collectively FIG. 2) illustrate a client computing device 210 connected to a remote device 250 via a network 205. In FIG. 2, client application 212 operates in a full screen mode of operation. FIGS. 3A-3G (collectively FIG. 3) illustrate a client computing device 310 connected to a remote device 350 via a network 305. In FIG. 3, client application 312 operates in a "seamless" mode of operation. Client computing devices 210, 310 may be embodiments of mobile computing device 102, client applications 212, 312 may be embodiments of client application 116, remote devices 250, 350 may be virtual devices running on a server and may be examples of virtual device 150. In some embodiments, a client application supports both the full screen mode of operation and seamless mode of operation.

The OS of mobile devices 210, 310 exposes an API so that application 212, 312 that can be notified whenever the physical orientation of mobile device 210, 310 is changed by the user. As discussed above, the API may expose accelerometer data to client application 212, 312. Furthermore, the OS running in the remote device 250, 350 exposes a software framework that broadcasts accelerometer data to the applications running in the OS of the remote device 250, 350. The virtualization server software architecture HAL may comprise a synthetic accelerometer HAL (e.g., synthetic accelerometer HAL 130) that receives orientation changes from the client application 212, 312 via discrete messages. The synthetic accelerometer HAL can, in turn, generate synthetic acceleration vectors to the sensor framework of the remote device 250, 350.

In FIG. 2A, the user is observing the local system UI which includes an OS portion (represented by status bar 220) and an application area 222. Status bar 220 has the label LOCAL in this figure as it represents the locally generated status bar (e.g., the status bar generated by the OS of client device 210). The status bar 220 provided by the local OS typically displays icons like time of day, signal strength, connection method, notifications, or other information. Application area 222 is used to display the content/interface of the operating system or application executing in the operating system based on the current context for the system UI. In FIG. 2A, application area 222 presents a list of applications from which to choose. The user proceeds to start the client application 212 and client application 212 connects to a virtualization server which connects client application 212 with remote device 250.

In operation, the system UI of remote device 250 (the remote system UI) can be configured to generate a remote device display 255 (e.g., a virtual display) and provide the remote device display to client application 212 for rendering as remote display 215. In this case, the virtual display 255 includes a status bar 260 provided by the OS of remote device 250. Status bar 260 has the label REMOTE in this figure as it represents the status bar generated by remote device 250 (e.g., the status bar generated by the OS of remote device 250). Virtual display 255 also includes a remote application visible area 262 that represents the portion of virtual display 255 in which the contents/interface of an application running in the OS of remote device 250 (or the content/interface of the OS depending on the context of the remote system UI) would be visible if virtual display 255 was rendered to a display device.

The system UI of remote device 250 can be configured to send client application 212 several pieces of display information when client application 212 connects to remote device 250. These can include i) the dimension in pixels of the virtual display (height and width), ii) UI orientation angle; iii) rectangle coordinates of the remote application visible area 262. This rectangle may exclude the area reserved by the remote system UI for, for example, the status bar or navigation bar (e.g., excludes the portion of the display reserved for exclusive use of the OS and delineates the portion of display 255 used for displaying content of mobile apps executing in the OS of virtual device 250). The remote device 250 can provides the virtual display 255 to client application 212 as a display stream via a display data channel.

FIG. 2B illustrates an embodiment of a process that occurs when client application 212 is connected to a remote device 250 in full screen mode. When client application 212 is in the full screen mode, the entire local system UI display may be used as the application area 222.

Client application 212 connects to remote device 250, remote device 250 communicates a UI orientation signal 270 that includes:

1. The dimensions, in pixels, of the display 255: Width and Height.
2. UI Orientation Angle. In this case 0°, also known as portrait orientation.
3. Rectangle coordinates of the remote application visible area. This rectangle excludes the area reserved by the system UI, for example status bar 260.

If it is assumed that the area reserved by the remote system UI for status bars or other information is at the top of the display in portrait mode, as illustrated in FIG. 2B, the rectangle coordinates of the remote application visible area can be expressed as Left: 0, Top: t, Right: W, Bottom: H; or (0,t)–(W,H) for short. In this example, the (W,H) that indicates bottom right corner of the remote application display area of virtual display 255 also expresses the dimension of display 255. As will be appreciated, the UI orientation information can be expressed in a variety of manners.

In FIG. 2B, the remote device 250 communicates that it is oriented 0° degrees from portrait orientation. The client application then "enforces" the local UI orientation to 0° degrees portrait too. That is, the client application mirrors the system UI orientation angle of the remote device 250 system UI orientation. In full screen mode the client application renders the image of the complete virtual display 255 as remote display 215. In this mode, client application 212 disregards the rectangle coordinates (0,t)–(W,H). Thus, the UI of application 212 presents a remote display 215 image of display 255 including the REMOTE status bar 260 generated at remote device 250 and the remote application visible area 262, while hiding the local system UI status bar 220.

Figure 2C:
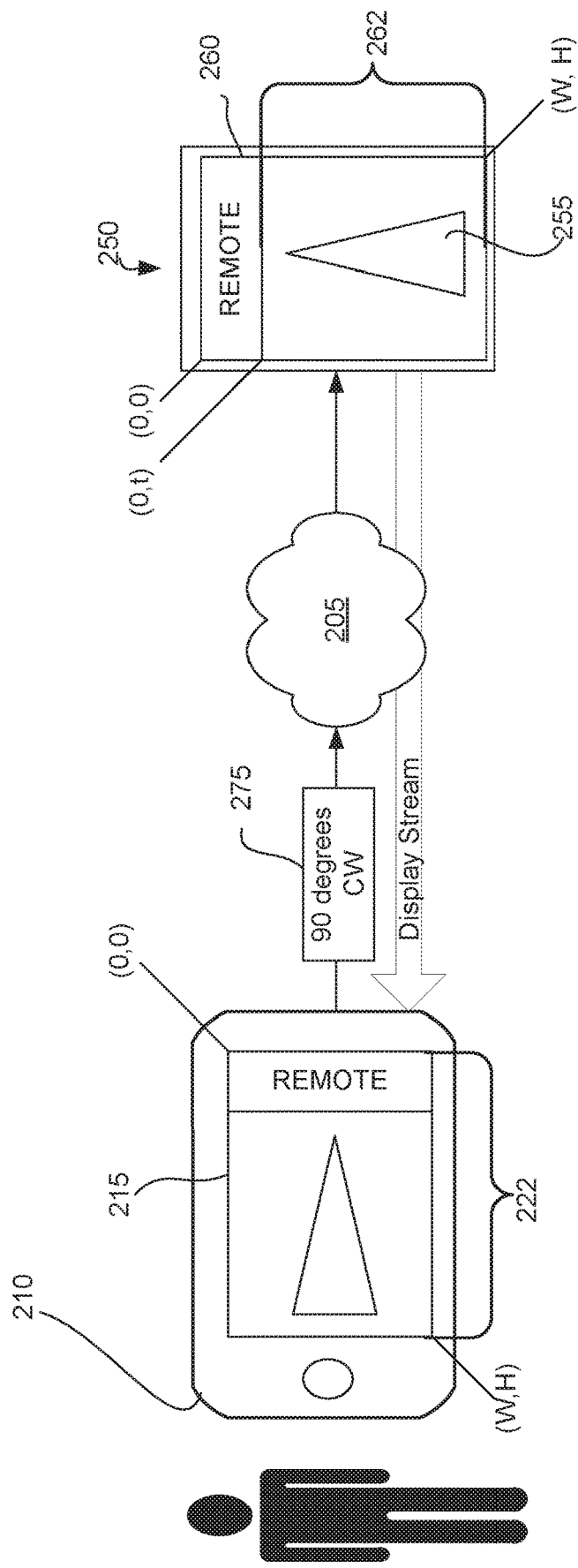
FIG. 2C illustrates one embodiment of a system with the client device rotated to a second orientation.

In FIG. 2C, the user decides to rotate the client device 210 90 degrees clockwise. As discussed in conjunction with FIG. 1, a low pass filter can be applied to the rotation/accelerometer data provided by the OS running in the client device 210. This approach is very useful to avoid sending spurious orientation changes to the remote device 250, hence reducing data network traffic and visual artifacts.

When the client application 212 senses the orientation change, client application 212 sends an orientation change event message 275, which may be a single discrete message in one embodiment, to the remote device 250. Orientation change event message 275 encodes that the client device 210 has changed its orientation 90° clockwise. Because the client application 212 is enforcing the local UI at 0 degrees portrait nothing changes visually in the local screen yet.

Figure 2D:
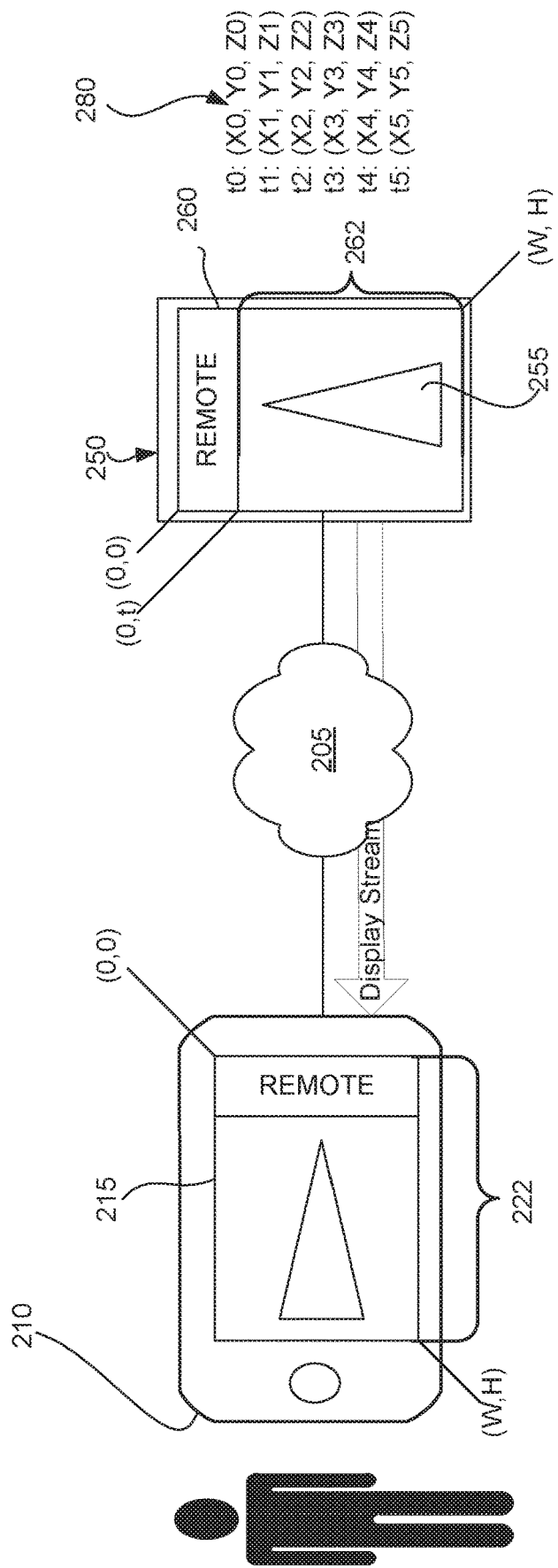
FIG. 2D illustrates the system of FIG. 2C generating one embodiment of a set of synthetic accelerometer signals.

With respect to FIG. 2D, the orientation change event message is received by the synthetic accelerometer HAL, which generates a set of synthetic accelerometer signals 280. For example, the synthetic accelerometer HAL generates six accelerometer vectors that are similar, but not identical, to the sensor framework of the remote device 250. According to one embodiment, the signals are selected as a way to simulate the type of data that is generated by a hardware accelerometer given the imperfections of the human pulse.

Figure 2E:
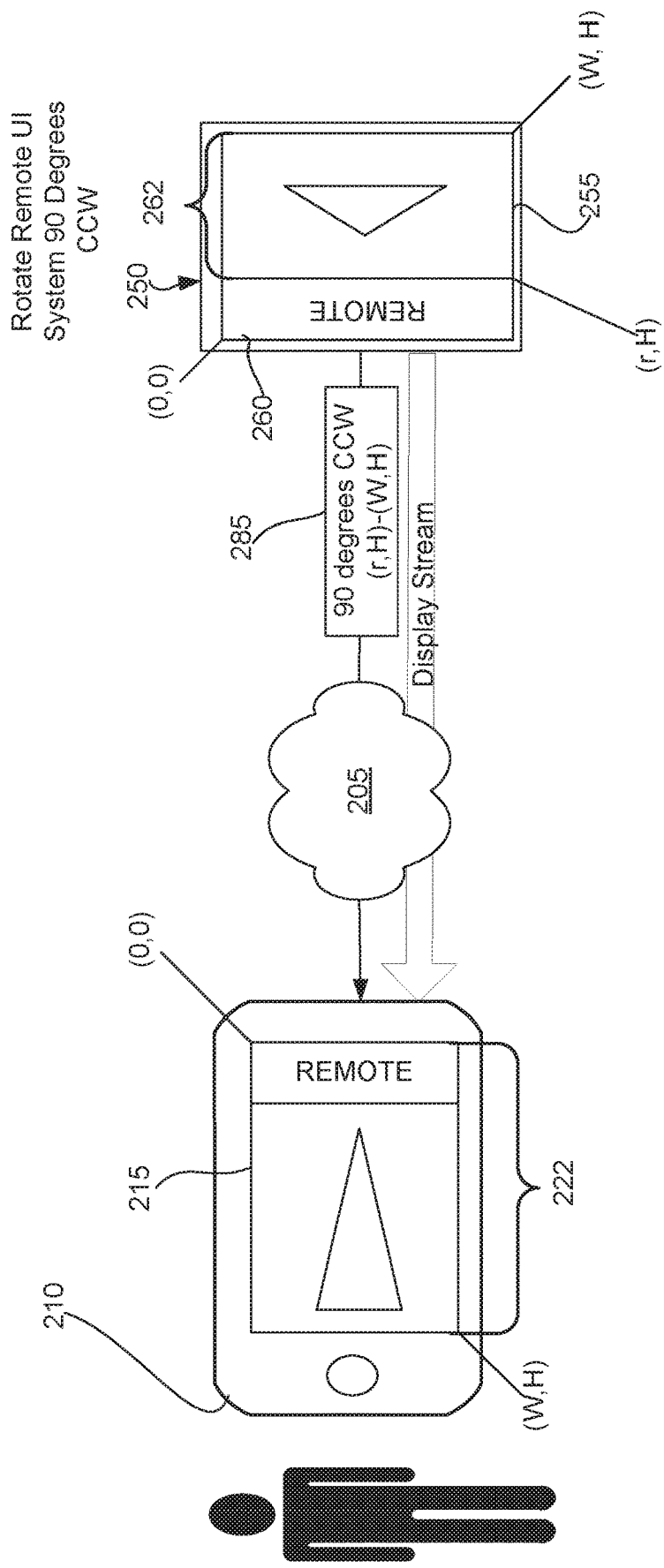
FIG. 2E illustrates an embodiment in which the remote system UI has been rotated responsive to the set of synthetic accelerometer signals.

If the application for which an application interface/content is being displayed in the remote application visible area 262 of virtual display 255 supports orientation changes, the system UI of remote device 250 can generate an orientation signal to client device 210. FIG. 2E illustrates one embodiment of the system UI of the remote device 250 reacting to the series of six accelerometer vectors received from the sensors framework. The OS of the remote device 250 may apply a low pass filter to the received vectors and calculate the device orientation based on the accelerometer values. When the system UI of remote device 250 detects a valid change of orientation it may rotate and redraw the system UI accordingly; that is it may generate a new display 255 appropriate for the detected orientation change. In addition, the remote system UI may send a UI orientation message 285 to client application 212 signaling the new UI orientation and rectangle coordinates of the remote application visible area. Because of network latency, there may be some delay between when remote device 250 enforces an orientation change and the changes are reflected at client application 212.

Applications running in the remote device 250, however, may be configured to run on a given constant orientation. If one of these applications is the current context in the remote system UI when the remote system UI receives synthetic accelerometer signals 280, the remote system UI may maintain its orientation and not send a new UI orientation signal.

Figure 2F:
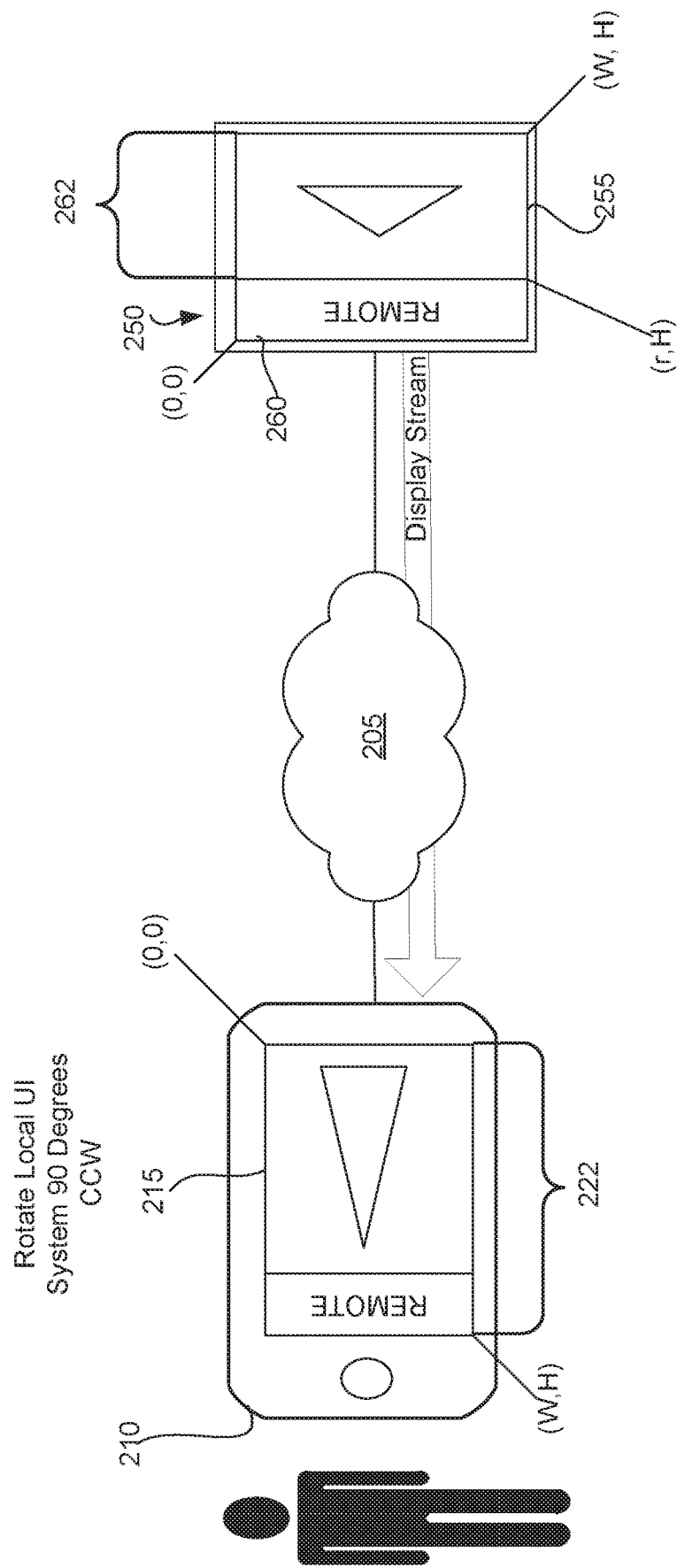
FIG. 2F illustrates one embodiment of a system in which the local system UI has been rotated.

With reference to FIG. 2F, responsive to receiving orientation signal 285, client app 212 knows that the system UI of remote device 250 has been rotated 90° counter clockwise to compensate for the detected change in device orientation. In response, client app 212 rotates the local system UI CCW. In this step, the client application 212 has forced the local UI to the same 90° CCW orientation as dictated by the remote device 250. However, because the image data in the display stream from remote device 250 will also represent the CCW rotation of the remote system UI, the rendered remote display 215, unless corrected, may appear over rotated as illustrated in FIG. 2F. Consequently, an additional linear transformation step may need to be applied to the display stream so that remote display 215 appears as the user expects to see it.

Figure 2G:
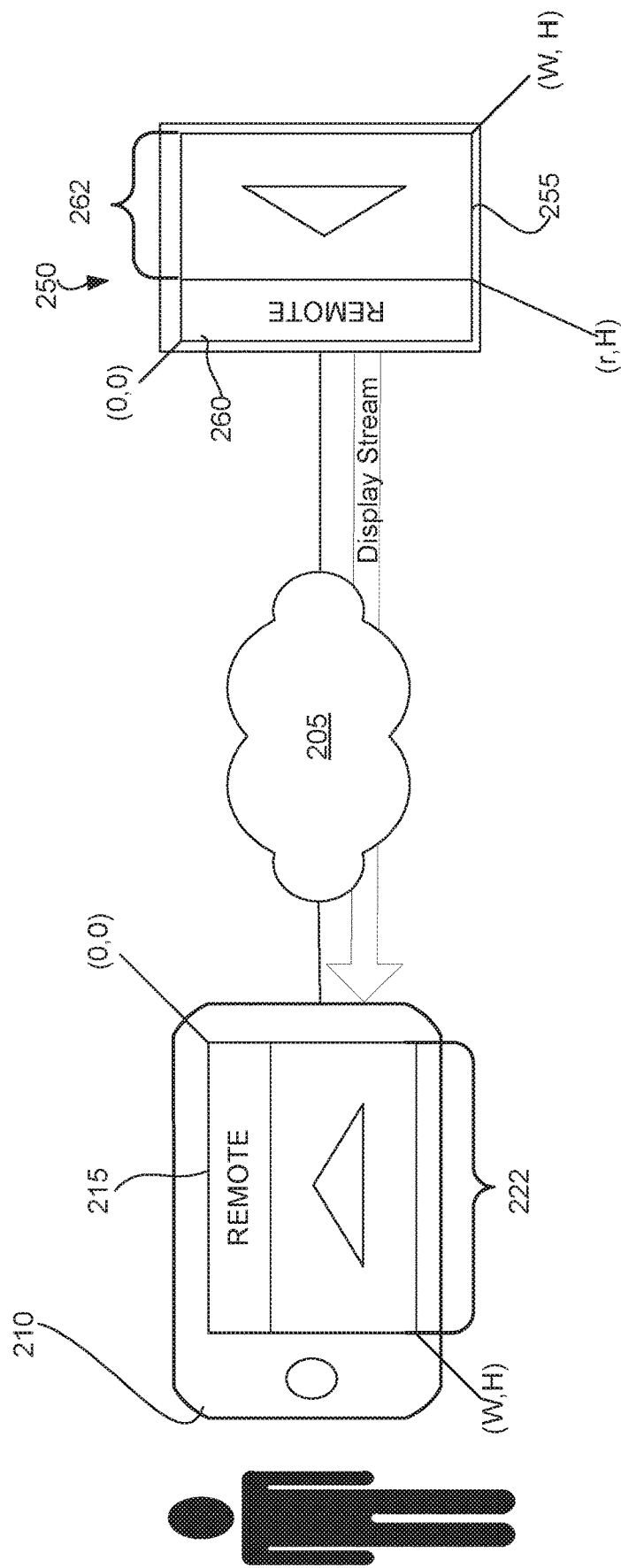
FIG. 2G illustrates one embodiment of a system in which a transformation has been applied to a display stream.

FIG. 2G illustrates a further transformation step. The transformation step may apply the opposite rotation to the display stream as was applied to the local system UI. For example, in FIG. 2G, application 212 applies a 90° clockwise linear transformation to the display stream. The user now sees the remote display 215 in the correct orientation. This final linear transformation can be a simple matrix rotation applied to the texture that is used to hold the display stream. This type of linear transformation is available on most modern OS in the form of a 3D Graphics API like OpenGL, Direct3D, etc.

Figure 3A:
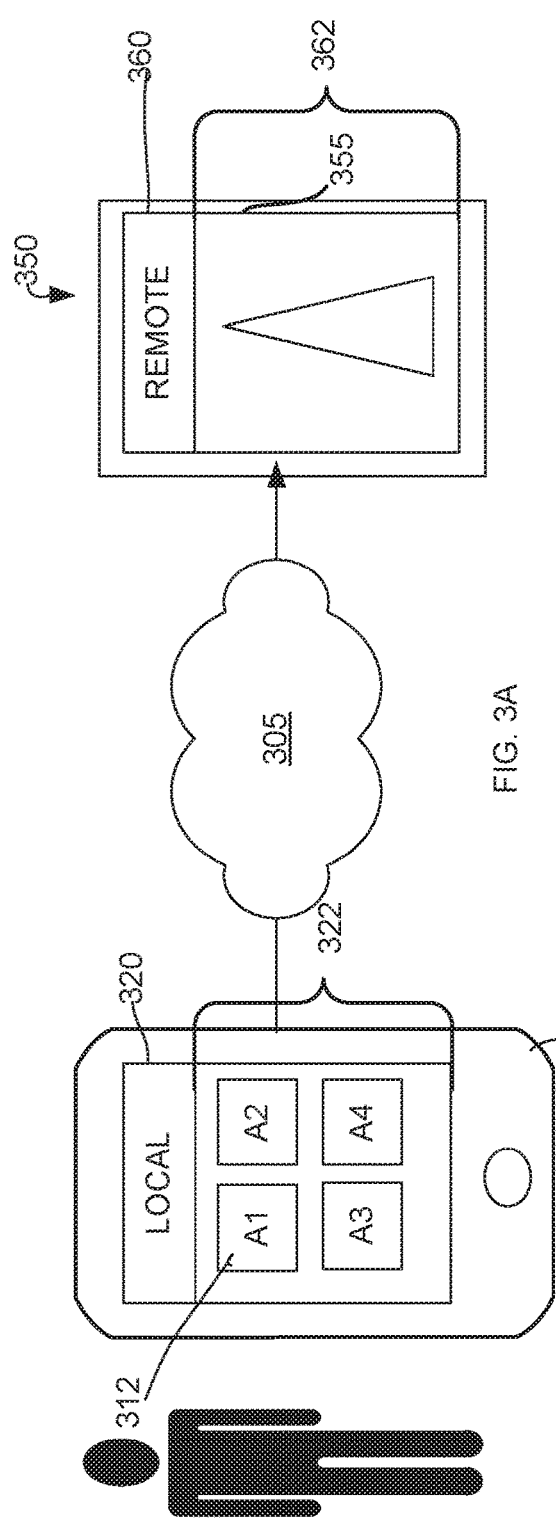
FIG. 3A illustrates another embodiment of a system having a client device and remote device where the client device is a first orientation.
Figure 3B:
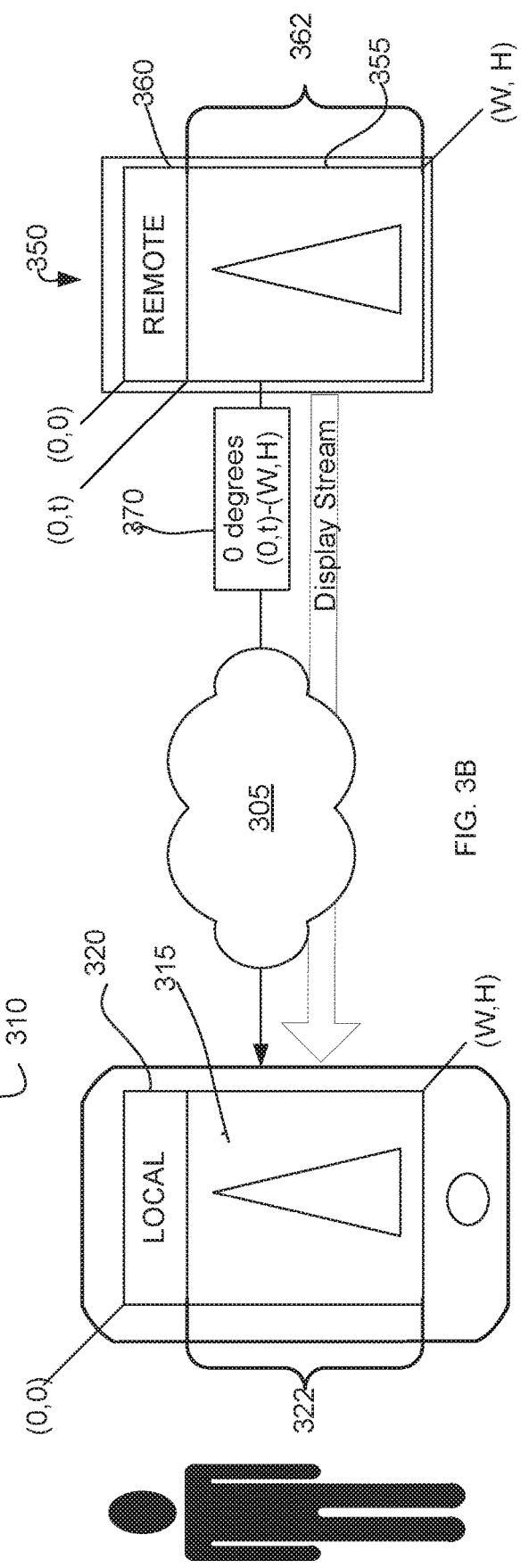
FIG. 3B illustrates another embodiment of a client application connected to a remote device.
Figure 3C:
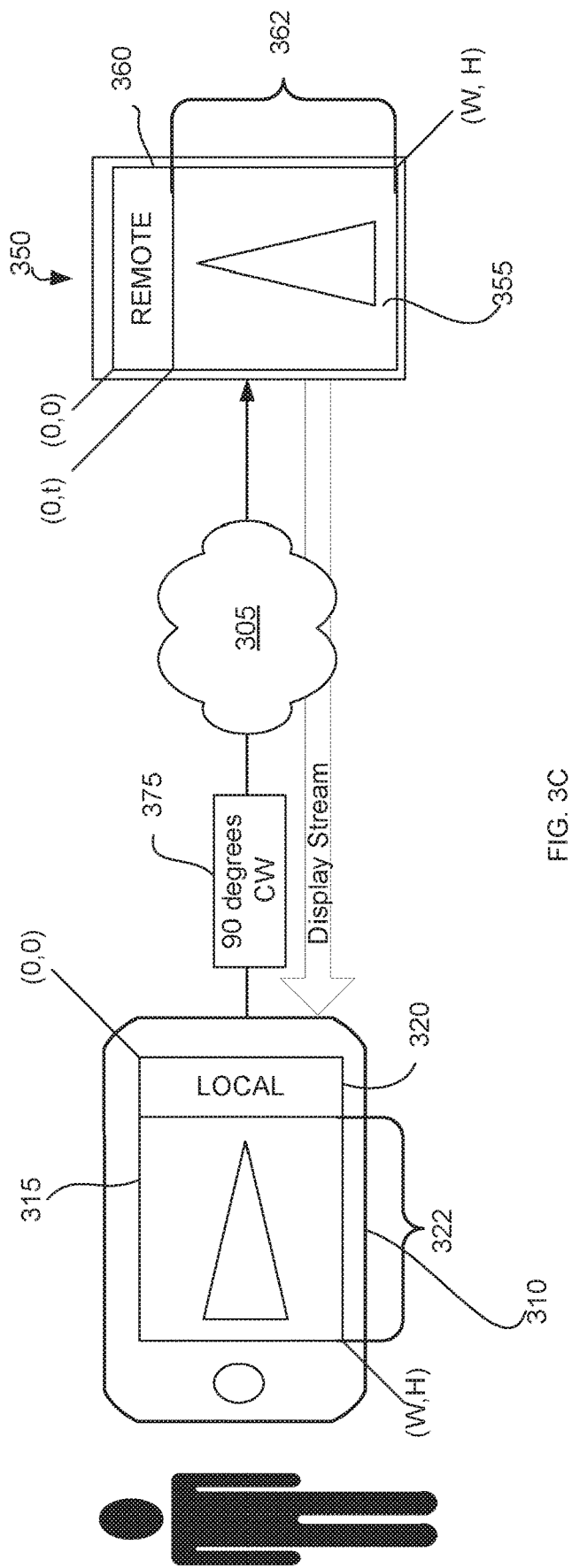
FIG. 3C illustrates another embodiment of a system with the client device rotated to a second orientation.
Figure 3D:
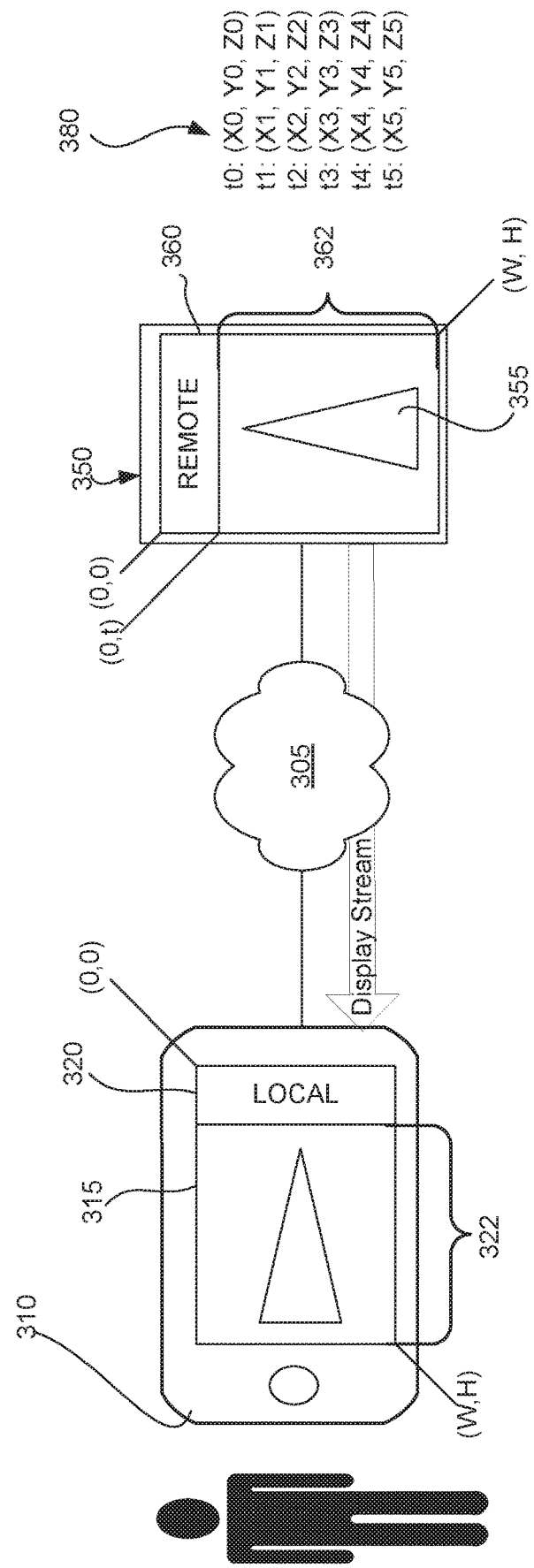
FIG. 3D illustrates the system of FIG. 3C generating one embodiment of a set of synthetic accelerometer signals.
Figure 3E:
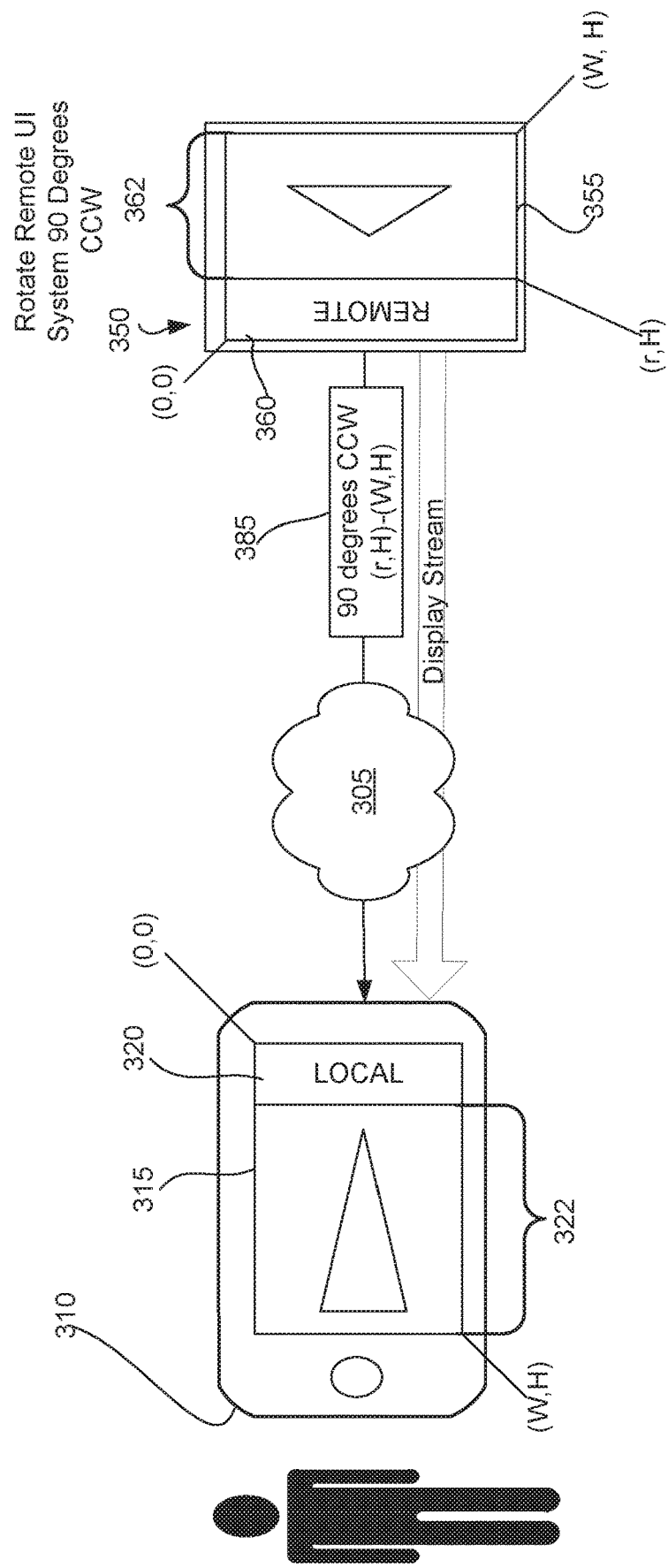
FIG. 3E illustrates an embodiment in which the remote system UI has been rotated responsive to the set of synthetic accelerometer signals.
Figure 3F:
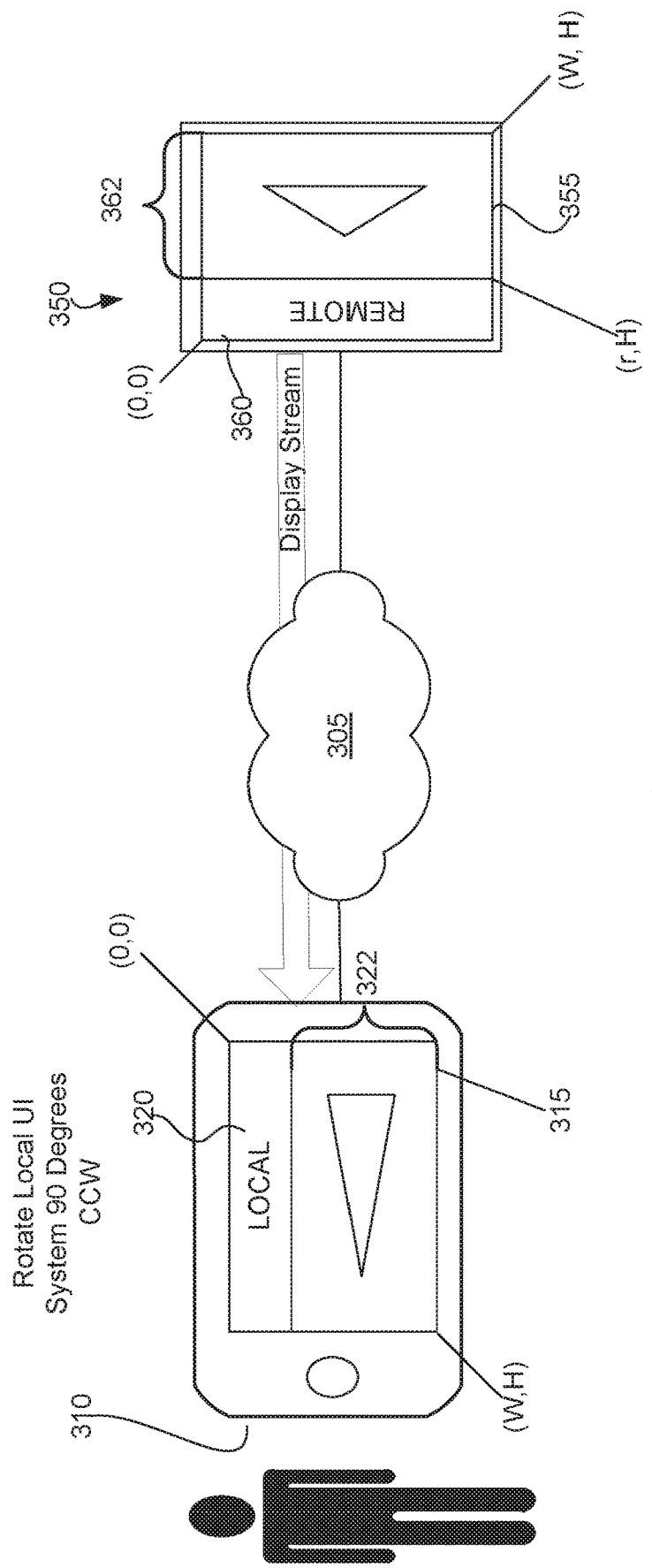
FIG. 3F illustrates one embodiment of a system in which the local system UI has been rotated.
Figure 3G:
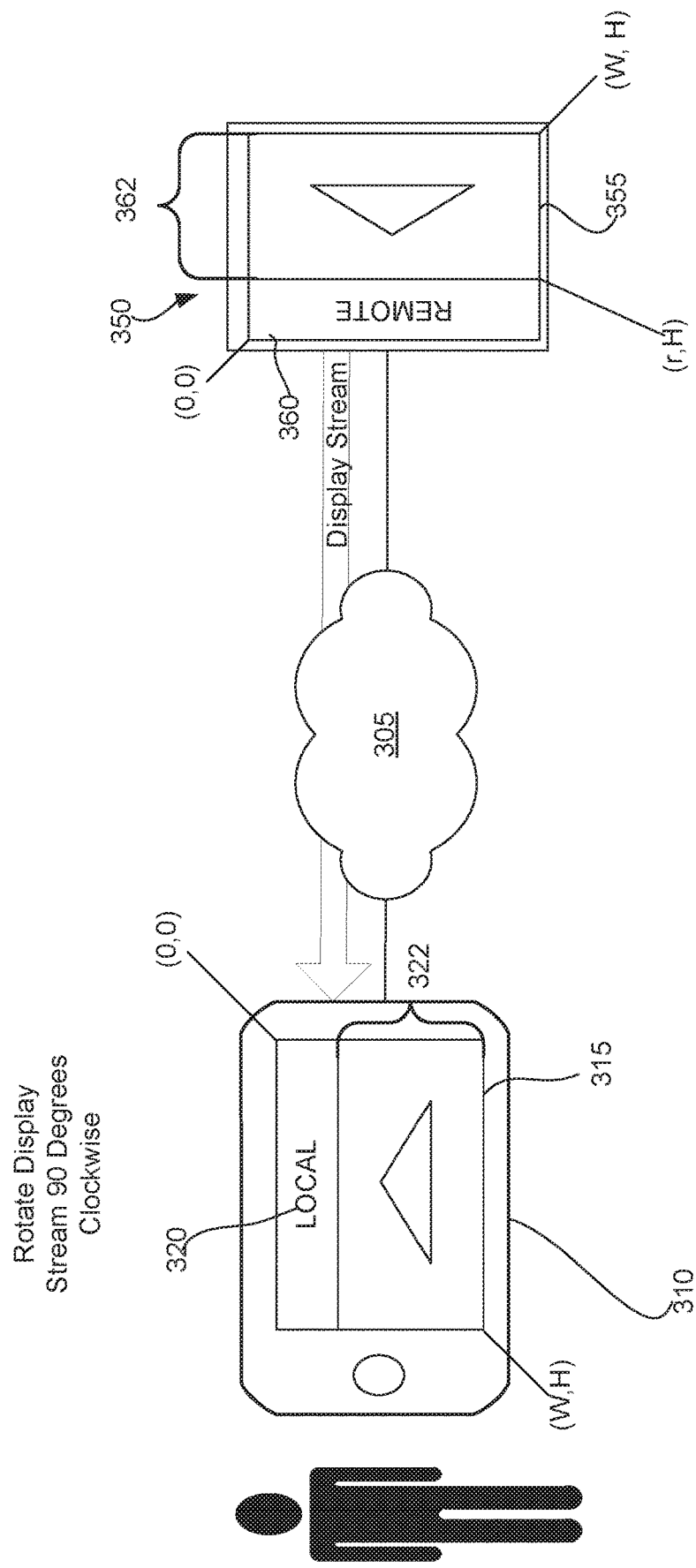
FIG. 3G illustrates one embodiment of a system in which a transformation has been applied to a display stream.

It can be noted that local system UI status bar 220 (see FIG. 2A) is hidden by remote display 215 in full screen mode but is properly oriented (e.g., similar to as shown in seamless mode FIG. 3G.) Because the client application 212 is enforcing its local system UI orientation to 90° CCW, the user can use the expected gestures to bring the local system UI forward because all the areas of the local system UI are properly aligned.

Figure 2H:
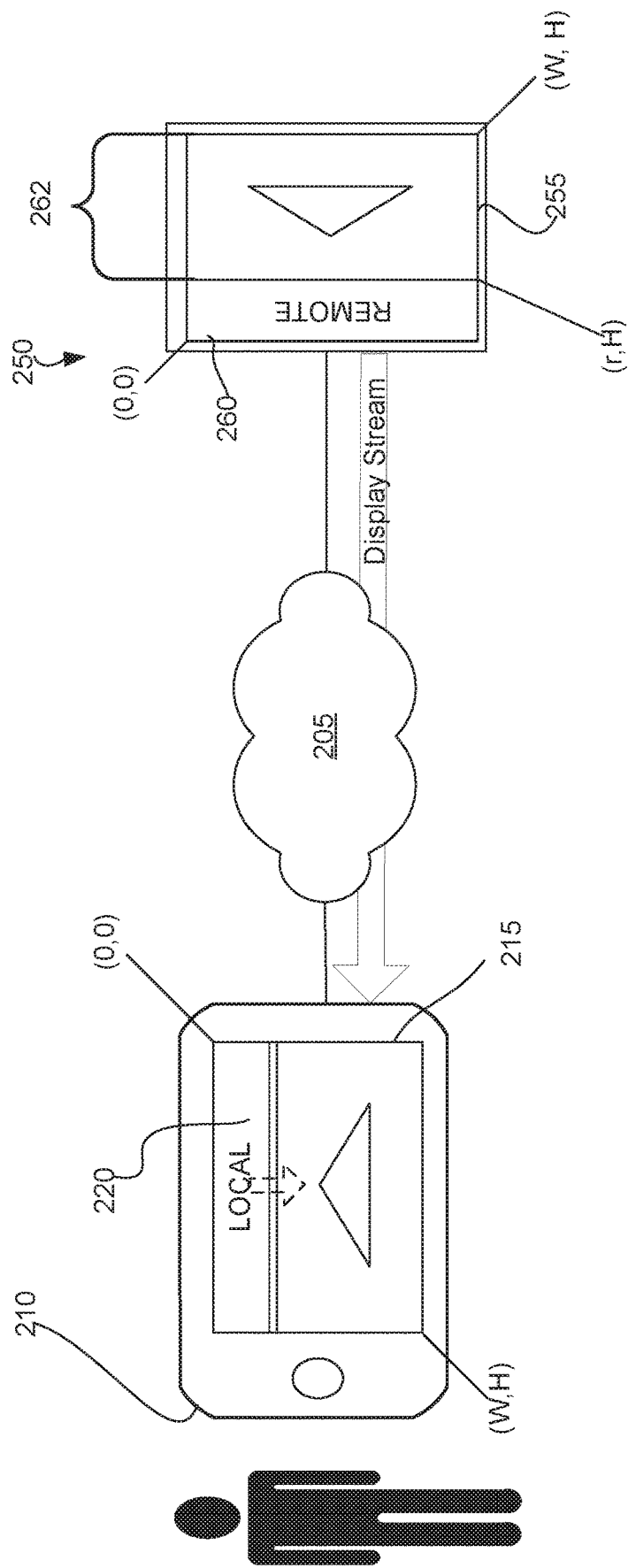
FIG. 2H illustrates one embodiment of accessing a local status bar.

For example, if a user can typically access the local status bar 220 by swiping down when mobile device 210 is in a landscape orientation and the application that is the current local UI context is in full screen mode, the user may access local status bar 220 by swiping down (e.g., as illustrated in FIG. 2H).

FIGS. 3A-3G (collectively FIG. 3) illustrate client device 310 operating in a seamless mode of operation. In FIG. 3A, the user is observing the local system UI which includes an OS portion (represented by status bar 320) and an application area 322. Status bar 320 has the label LOCAL in this figure as it represents the locally generated status bar (e.g., the status bar generated by the OS of client device 310). The status bar 320 provided by the local OS typically displays icons like time of day, signal strength, connection method, notifications, or other information. Application area 322 is the portion of the display for content/interface of the operating system or application executing in the operating system based on the current context for the system UI. In FIG. 3A, application area 322 presents a list of applications from which to choose. The user proceeds to start the client application 312 and client application 312 connects to a virtualization server which connects client application 312 with remote device 350.

In operation, the system UI of remote device 350 (the remote system UI) can be configured to generate a remote device display 355 (e.g., a virtual display) and provide the remote display to client application 312 for rendering as remote display 315. In this case, the virtual display 355 includes a status bar 360 provided by the OS of remote device 350. Status bar 360 has the label REMOTE in this figure as it represents the status bar generated by remote device 350 (e.g., the status bar generated by the OS of remote device 350). Virtual display 355 also includes a remote application visible area 362 that represents the portion of virtual display 355 in which the contents/interface of an application running in the OS of remote device 350 (or the content/interface of the OS depending on the context of the remote system UI) would be visible if virtual display 355 was rendered to a display device.

The system UI of remote device 350 can be configured to send client application 312 several pieces of display information when client application 312 connects to remote device 350. These can include i) the dimension in pixels of the virtual display (height and width), ii) UI orientation angle; iii) rectangle coordinates of the remote application visible area 362. This rectangle may exclude the area reserved by the remote system UI for, for example, the status bar or navigation bar (e.g., excludes the portion of the display reserved for exclusive use of the OS and delineates the portion of display 355 used for displaying content of mobile apps executing in the OS of virtual device 350). The remote device 350 can provides the display 355 to client application 312 as a display stream via a display data channel.

In FIG. 3B, the remote device 350 communicates that it is oriented 0° degrees from portrait orientation. The client application then "enforces" the local UI orientation to 0° degrees portrait too. That is, the client application mirrors the system UI orientation angle of the remote device 350 system UI. In contrast to FIG. 2B, the client application 312 in FIG. 3B renders only the area of the virtual display image encompassed by the rectangle coordinates (0,t)–(W,H) (the remote application visible area) as remote display 315. That is, client application 312 renders the image of remote application visual area 362. The remote status bar 360 is excluded, and instead the local status bar 320 is displayed.

FIGS. 3C-3G are similar to FIGS. 2C-2G except that the client application 312 continues to render as the remote display 315 only the portion of the virtual display 255 encompassed by the remote application visual area rectangle coordinates.

In FIG. 3C, the user decides to rotate the client device 310 90 degrees clockwise. As discussed in conjunction with FIG. 1, a low pass filter can be applied to the rotation/accelerometer data provided by the OS running in the client device 310. When the client application 312 senses the orientation change, client application 312 sends an orientation change event message 375, which may be a single discrete message in one embodiment, to the remote device 350. Orientation change event message 375 encodes that the client device 310 has changed its orientation 90° clockwise. Because the client application 312 is enforcing the local UI at 0 degrees portrait nothing changes visually in the local screen yet.

With respect to FIG. 3D, the orientation change event message is received by the synthetic accelerometer HAL, which generates a set of synthetic accelerometer signals 380. For example, the synthetic accelerometer HAL generates six accelerometer vectors that are similar, but not identical, to the sensor framework of the remote device 350. According to one embodiment, the signals are selected as a way to simulate the type of data that is generated by a hardware accelerometer given the imperfections of the human pulse.

If the application for which an application interface/content is being displayed in the remote application visible area 362 of virtual display 355 supports orientation changes, the system UI of remote device 350 can generate an orientation signal to client device 310. FIG. 3E illustrates one embodiment of the system UI of the remote device 350 reacting to the series of six accelerometer vectors received from the sensors framework to generate a UI orientation signal. The OS of the remote device 350 may apply a low pass filter to the received vectors and calculate the device orientation based on the accelerometer values. When the system UI of remote device 350 detects a valid change of orientation it may rotate and redraw the system UI accordingly; that is it may generate a new display 355 appropriate for the detected orientation change. In addition, the remote system UI may send a UI orientation message 385 to client application 312 signaling the new UI orientation and rectangle coordinates of the remote application visible area. Because of network latency, there may be some delay between when remote device 350 enforces an orientation change and the changes are reflected at client application 312.

Applications running in the remote device 350, however, may be configured to run on a given constant orientation. If one of these applications is the current context in the remote system UI when the remote system UI receives synthetic accelerometer signals 380, the remote system UI maintains it orientation and does not generate a new UI orientation signal.

With reference to FIG. 3F, responsive to receiving orientation signal 385, client app 312 knows that the system UI of remote device 350 has been rotated 90° counter clockwise to compensate for the detected change in device orientation. In response, client app 312 rotates the local system UI CCW. In this step, the client application 312 has forced the local UI to the same 90° CCW orientation as dictated by the remote device. However, because the image data in the display stream from remote device 350 will also represent the CCW rotation of the remote system UI, the rendered remote display 315, unless corrected, may appear over rotated as illustrated in FIG. 3F. Consequently, an additional linear transformation step may need to be applied to the display stream so that remote display 315 appears as the user expects to see it.

FIG. 3G illustrates a further transformation step. The transformation step may apply the opposite rotation to the display stream as was applied to the local system UI. For example, in FIG. 3G, application 312 applies a 90° clockwise linear transformation to the display stream. The user now sees the remote display 315 in the correct orientation. This final linear transformation can be a simple matrix rotation applied to the texture that is used to hold the display stream. This type of linear transformation is available on most modern OS in the form of a 3D Graphics API like OpenGL, Direct3D, etc.

Figure 4:
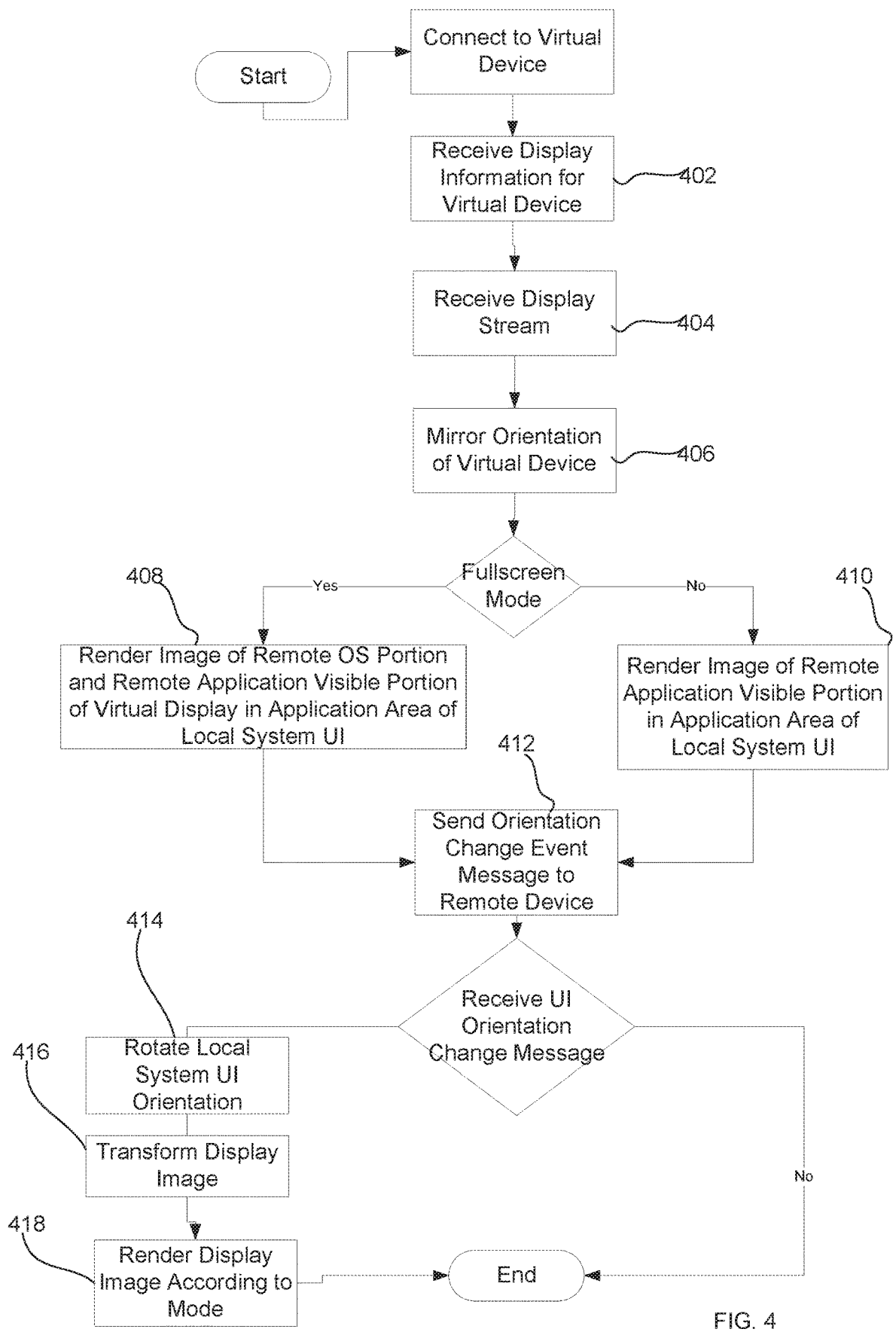
FIG. 4 is a flow chart illustrating one embodiment of a method for UI synchronization method at a mobile device.

FIG. 4 illustrates one embodiment of a method for a client application (client application 116, 212, 312) executing in an operating system of a mobile device to display a remote display. At step 400, the client connects to a virtual mobile device running in a server. The virtual device may be a remote execution environment for the services and applications that make up a mobile device.

The client application receives display information for a virtual display generated by the virtual device (step 402). According to one embodiment, the display information includes the dimensions of a virtual display in pixels, a UI orientation angle of the remote system UI and coordinates of a remote application visible area of the virtual display. The client application also receives a display stream comprising a stream of images of the virtual display (step 404). The client application may continuously receive the display stream while connected to the virtual device. The client application sets the orientation of the local system UI to mirror that of the remote system UI (step 406).

Based on a determination that the client application is in a full screen mode of operation, the client application renders an image of the entire virtual display from the display stream in the application area of the local system UI (step 408). The image of the entire virtual display may include both the portions of the virtual display used to display information provided by the remote OS regardless of the application running in the remote OS (e.g., status bars, navigation bars, and other information) and a remote application visible area that represents the portion of the virtual display displaying the content/interface of an application executing in the remote operating system, depending on the current context of the remote system UI.

Based on a determination that the client application is not in a full screen mode of operation, the client application renders the remote application visible area as the remote display in the application area of the local system UI in conjunction with a local OS portion (e.g., a local status bar, local navigation bar or other information provided by the local OS) (step 410). Thus, the local status bar (or other locally generated information) coexists visually with the remote display content. The client application, however, removes or crops away parts of the display stream that are not part of the remote application visible area, e.g., the remote device status bar, the remote device navigation bar, or other information. The local status bar may be aligned with the orientation remote system UI, making it appear as though a remote application is executing in the local operating system.

If the client application determines that an orientation change has occurred, the client application sends the virtual device an orientation change event message (step 412). Responsive to receiving a new UI orientation message, the client application rotates the local system UI according to the orientation indicated in the UI orientation message (step 414). Further, the client application counter rotates the data stream (step 416). For example, if the client application receives a UI orientation message indicating that the client application should rotate clock wise 90 degrees, the client application can rotate the local system UI 90 degrees clock wise and counter rotate the display stream 90 degrees counter clock wise.

The client application displays the transformed data stream in application area of the local system UI based on the mode (step 418). If the client application is in a full screen mode of operation, the client application renders a transformed (e.g., counter rotated) image of the entire virtual display from the display stream in the application area of the local system UI. In a non-full screen mode of operation, the client application renders the portion of the image for the remote application visible area of the virtual display in the application area of the local system UI in conjunction with a local OS portion (e.g., a local status bar, local navigation bar or other information provided by the local OS). The steps of FIG. 4 may be repeated as needed or desired, additional or alternative steps performed, or steps omitted.

Figure 5:
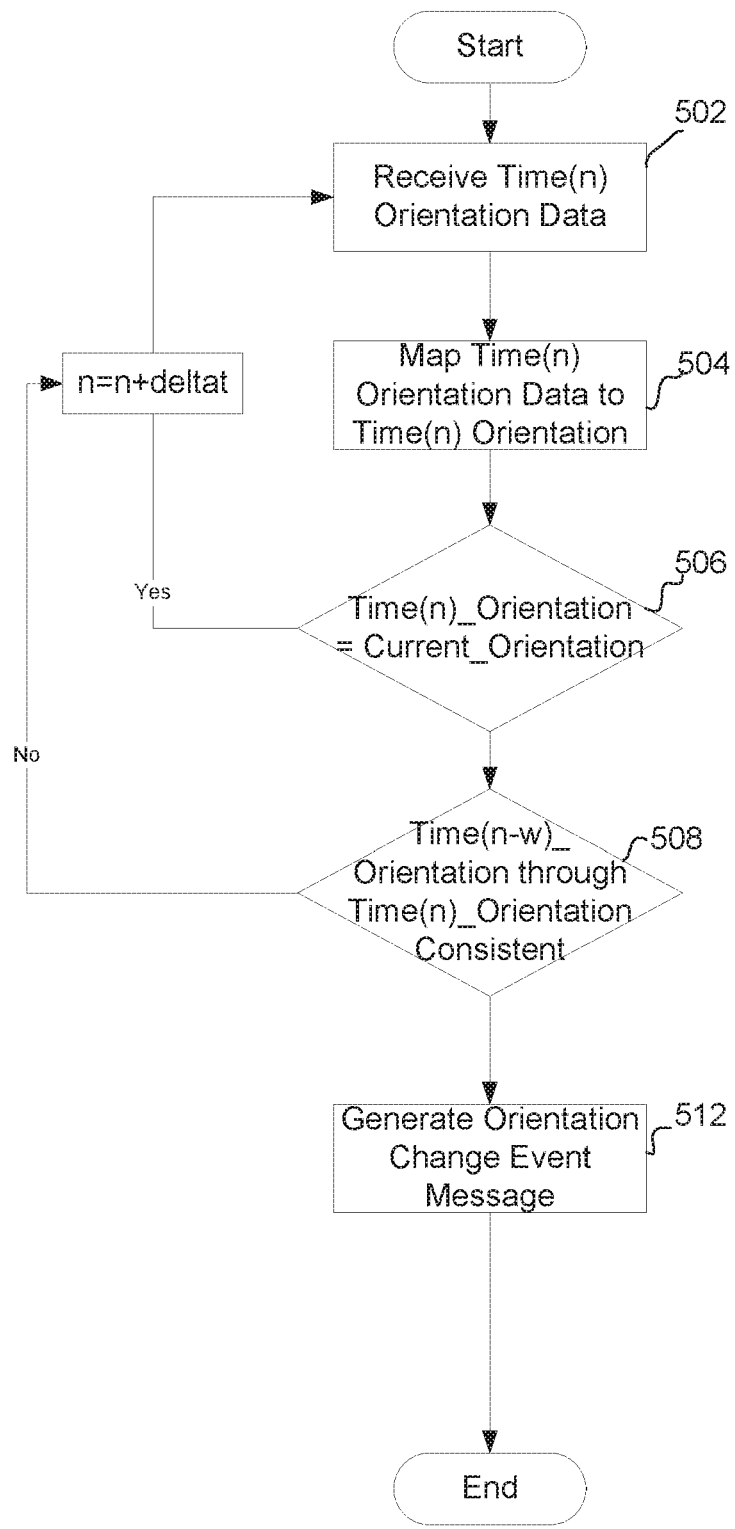
FIG. 5 is a flow chart illustrating one embodiment of registering an orientation change.

FIG. 5 is a flow chart of one embodiment for generating an orientation change event message. The method of FIG. 5 may be performed, in one embodiment, by a client application (e.g., client application 116, 212, 312) running in an operating system of a mobile device.

The client application receives orientation data at time 'n' (step 502). For example, the OS of a mobile device may expose data from an accelerometer. The orientation data may thus be accelerometer data indicating an orientation of the mobile device. In other embodiments, an APIs may be available that simply disclose display orientation changes in terms of names like "portrait", "landscape", "reverse landscape", "upside down portrait".

The client application maps the time(n) orientation data to a device orientation (step 504). For example, the client application may map accelerometer data to an orientation. If the API already provides an orientation, such mapping may not be performed.

The client application compares the orientation indicated by the time(n) orientation data to the current orientation set for the local system UI (step 506). If the time(n) orientation does not indicate a change in orientation, the client application continues to collect orientation data (e.g., returns to step 502 and collects orientation data for the new time). If the time(n) orientation data does indicate a change in orientation, the client application determines if the orientation change has remained constant over a window w (step 508). For example, if the current orientation=0 degrees and the time(n) orientation is 90 degrees clockwise, the client application determines if the prior orientations in the time window w, say the orientations determined over the last 400 ms or other window, also indicate an orientation of 90 degrees clockwise. If so, the client application generates an orientation change event message to the remote device (step 512). The orientation change event message may specify the new orientation angle as an acceleration vector. If the orientation change has not remained constant over the window, the client application can continue to monitor orientation data to determine when an orientation change event occurs. The steps of FIG. 5 may be repeated as needed or desired, additional or alternative steps performed, or steps omitted.

Figure 6:
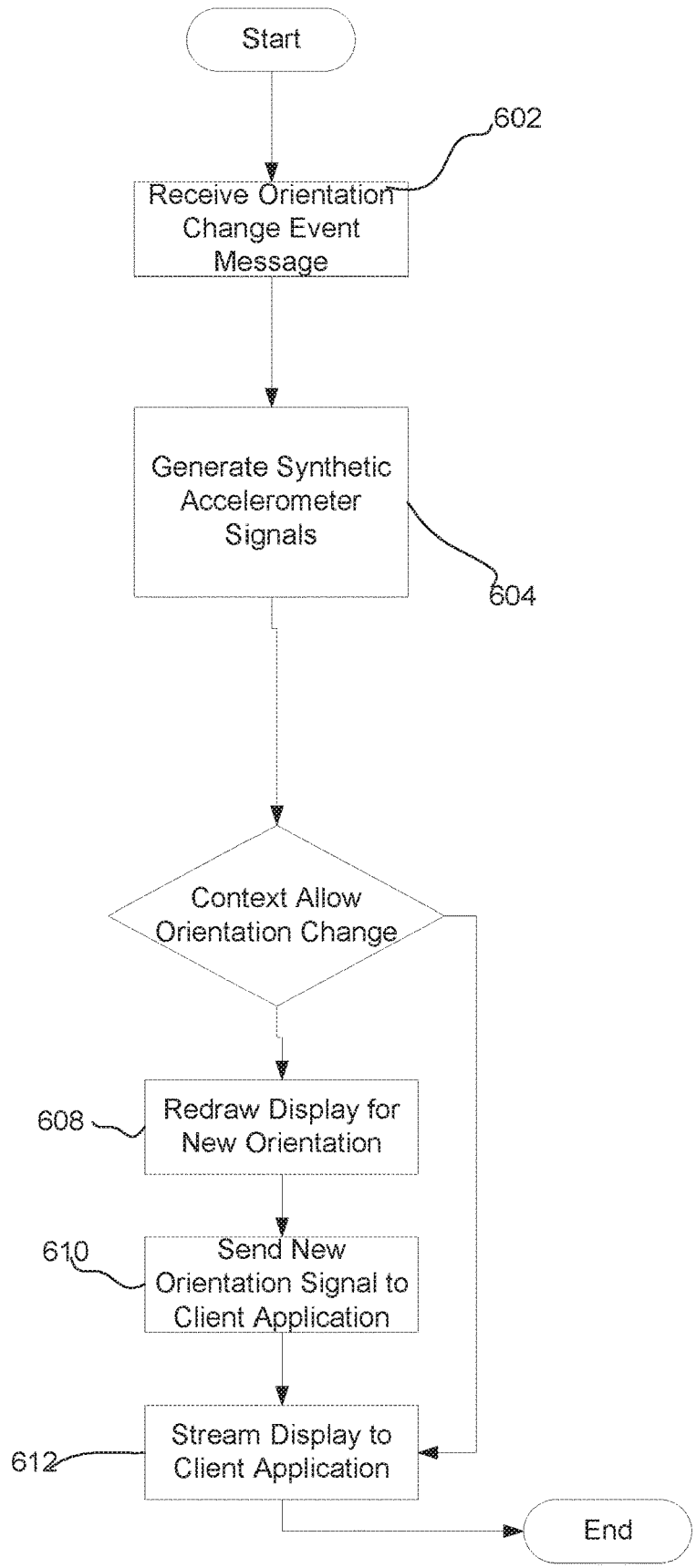
FIG. 6 is a flow chart illustrating one embodiment of a UI synchronization method at a virtual device.

FIG. 6 is a flow chart of one embodiment of a method for processing an orientation change event message. According to one embodiment, the method of FIG. 6 may be practiced by a virtualization server software architecture (e.g., virtualization server software architecture 125) that runs virtual mobile devices. For example, one or more steps may be implemented in a synthetic accelerometer HAL while others may implemented in a virtual device.

According to one embodiment, a synthetic accelerometer HAL receives an orientation change event message from a client application (step 602). The HAL generates synthetic accelerometer signals indicative of the received orientation change and that are selected to pass a low pass filter of the operating system of the virtual device (step 604). According to one embodiment, for an orientation change event message that contains the accelerometer data Xk, Yk, Zk, the synthetic accelerometer can dispatch the following vectors:

At time0, (X0,Y0,Z0)=(Xk−1.0, Yk+1.0, 0.0)
At time1, (X1,Y1,Z1)=(Xk+1.0, Yk−1.0, 0.0)
At time2, (X2,Y2,Z2)=(Xk, Yk, 0.0)
At time3, (X0,Y0,Z0)=(Xk−1.0, Yk+1.0, 0.0)
At time4, (X1,Y1,Z1)=(Xk+1.0, Yk−1.0, 0.0)
At time5, (X2,Y2,Z2)=(Xk, Yk, 0.0)
time1=(time0+30 ms) and time2=(time1+30 ms), and so on. In this example, the time interval 30 ms is provided by way of example and other time intervals may be used. Moreover, more or fewer vectors may be dispatched. Furthermore, the foregoing synthetic vectors are provided by way of example. The number, timing of the synthetic accelerometer values and the differences between values can be selected to compensate for data filters applied by the virtual device (e.g., by the virtual device OS or remotely running application) so that the remote application running in virtual device will register the orientation change.

The operating system of a virtual device can expose the accelerometer signals from the synthetic accelerometer HAL to the remote system UI of the virtual device. If the context of the remote system UI allows for orientation changes (e.g., the current application executing in the virtual device OS supports orientation changes), the remote system UI redraws a virtual display according to the orientation change (step 608). The remote system UI further sends a new UI orientation signal to the client application (step 610) and continues to stream the virtual display to the client application (step 612). If the context of the remote system UI does not allow orientation changes, the remote system UI continues to the stream the virtual display to the client application without redrawing it for the orientation change. The steps of FIG. 5 may be repeated as needed or desired, additional or alternative steps performed, or steps omitted.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a CPU, ROM, RAM, storage memory (e.g., a hard drive), and an I/O device. The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and storage memory can store computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium.

Any suitable programming language can be used to implement the routines, methods or programs of embodiments of the invention described herein, including C, C++, Java, JavaScript, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain or store a program for use by or in connection with the instruction execution system, apparatus, system or device. The computer readable medium can be, by way of example only but not by limitation, an electronic, magnetic, optical, electromagnetic, or semiconductor system, apparatus, system, device or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term (i.e., that the reference "a" or "an" clearly indicates only the singular or only the plural). Also, as used in the description herein, the meaning of "in" includes "in" and "on" unless the context clearly dictates otherwise.

What is claimed is:

1. A system, comprising:
   a virtual device platform including one or more processors programed with computer program instructions that, when executed, cause the virtual device platform to:
   send a display stream including a virtual display of a virtual device to cause a mobile device to render the virtual display via a mobile device user interface (UI);
   obtain an orientation change event message from the mobile device, the orientation change event message including a change in orientation of the mobile device;
   change orientation of a virtual device UI based on the change in the orientation of the mobile device; and
   generate an orientation signal and send the orientation signal to the mobile device to cause (i) a change in orientation of the mobile device UI based on the orientation signal, (ii) a change in orientation of the display stream to compensate for changing the orientation of the mobile device UI based on the changed orientation of the virtual device UI, and (iii) the mobile device UI to render the virtual display based on the changed orientation of the display stream, the orientation signal including the changed orientation of the virtual device UI.

2. The system of claim 1, wherein the virtual device platform is caused to:
   generate a set of accelerometer signals based on the orientation change event message, the accelerometer signals selected to pass a low pass filter of the virtual device; and
   determine the change in the orientation of the mobile device based on the accelerometer signals.

3. The system of claim 1, wherein the orientation signal includes dimensions of the virtual display, an orientation angle of the virtual device UI, and coordinates of a visible area of a virtual application.

4. The system of claim 1, wherein the orientation change event message specifies the orientation of the mobile device as an acceleration vector.

5. The system of claim 1, wherein the change in the orientation of the mobile device is with respect to a user of the mobile device.

6. The system of claim 1, wherein a direction of the change in the orientation of the display stream is opposite to a direction of the change in the orientation of the mobile device UI to compensate for the change in the orientation of the mobile device UI.

7. The system of claim 1, wherein the orientation signal is sent via a network.

8. A method comprising:
   sending a display stream including a virtual display of a virtual device to cause a physical device to render the virtual display via a physical device user interface (UI);
   obtaining a first signal from the physical device, the first signal including a change in orientation of the physical device;
   changing orientation of a virtual device UI based on the change in the orientation of the physical device; and
   generating a second signal and sending the second signal to the physical device to cause (i) a change in orientation of the physical device UI based on the second signal, (ii) a change in orientation of the display stream to compensate for changing the orientation of the physical device UI based on the changed orientation of the virtual device UI, and (iii) the physical device UI to render the virtual display based on the changed orientation of the display stream, the second signal including the changed orientation of the virtual device UI.

9. The method of claim 8, further comprising:
   generating a set of accelerometer signals based on the first signal, the accelerometer signals selected to pass a low pass filter of the virtual device; and
   determining the change in the orientation of the physical device based on the accelerometer signals.

10. The method of claim 8, wherein the second signal includes dimensions of the virtual display, an orientation angle of the virtual device UI, and coordinates of a visible area of a virtual application.

11. The method of claim 8, wherein the first signal specifies the orientation of the physical device as an acceleration vector.

12. The method of claim 8, wherein the change in the orientation of the physical device is with respect to a user of the physical device.

13. The method of claim 8, wherein a direction of the change in the orientation of the display stream is opposite to a direction of the change in the orientation of the physical device UI to compensate for the change in the orientation of the physical device UI.

14. The method of claim 8, wherein the second signal is sent via a network.

15. One or more non-transitory, computer-readable media storing instructions that, when executed by one or more processors, effectuate operations comprising:
    sending a display stream including a virtual display of a virtual device to cause a physical device to render the virtual display via a physical device user interface (UI);
    obtaining a first signal from the physical device, the first signal including a change in orientation of the physical device;
    changing orientation of a virtual device UI based on the change in the orientation of the physical device; and
    generating a second signal and sending the second signal to the physical device to cause (i) a change in orientation of the physical device UI based on the second signal, (ii) a change in orientation of the display stream to compensate for changing the orientation of the physical device UI based on the changed orientation of the virtual device UI, and (iii) the physical device UI to render the virtual display based on the changed orientation of the display stream, the second signal including the changed orientation of the virtual device UI.

16. The non-transitory, computer-readable media of claim 15, further comprising:
    generating a set of accelerometer signals based on the first signal, the accelerometer signals selected to pass a low pass filter of the virtual device; and
    determining the change in the orientation of the physical device based on the accelerometer signals.

17. The non-transitory, computer-readable media of claim 15, wherein the second signal includes dimensions of the virtual display, an orientation angle of the virtual device UI, and coordinates of a visible area of a virtual application.

18. The non-transitory, computer-readable media of claim 15, wherein the first signal specifies the orientation of the physical device as an acceleration vector.

19. The non-transitory, computer-readable media of claim 15, wherein the change in the orientation of the physical device is with respect to a user of the physical device.

20. The non-transitory, computer-readable media of claim 15, wherein a direction of the change in the orientation of the display stream is opposite to a direction of the change in the orientation of the physical device UI to compensate for the change in the orientation of the physical device UI.

* * * * *